US012711115B1

(12) United States Patent
Mukerjee et al.

(10) Patent No.: US 12,711,115 B1
(45) Date of Patent: Aug. 18, 2026

(54) IDENTIFIER MAPPING SYSTEM AND METHOD

(71) Applicant: Docusign, Inc., San Francisco, CA (US)

(72) Inventors: Kunal Mukerjee, Seattle, WA (US); Abhinav Jain, Redmond, WA (US); Nikhil Patel, Kirkland, WA (US); Richard Tkachuk, Bellevue, WA (US)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 19/040,585

(22) Filed: Jan. 29, 2025

(51) Int. Cl.
*G06F 16/00* (2019.01)
*G06F 16/21* (2019.01)

(52) U.S. Cl.
CPC .......... *G06F 16/219* (2019.01); *G06F 16/212* (2019.01)

(58) Field of Classification Search
CPC ............................. G06F 16/219; G06F 16/212
See application file for complete search history.

(56) References Cited

U.S. PATENT DOCUMENTS 10,114,810 B2 * 10/2018 Raleigh ................. G06F 40/134
10,885,009 B1 * 1/2021 Anghel ............... G06F 16/2315
2011/0295936 A1 * 12/2011 Gill ....................... G06F 16/954 709/203
2015/0039990 A1 * 2/2015 Tecu ..................... G06F 3/1275 715/229
2016/0055143 A1 * 2/2016 Goel ..................... G06F 16/328 715/229
2024/0265408 A1 * 8/2024 Singh ................. G06Q 10/0639

FOREIGN PATENT DOCUMENTS

WO WO-2015140745 A2 * 9/2015 ......... G06Q 10/0633

OTHER PUBLICATIONS

Paskin, “Toward Unique Identifiers”,1999,IEEE,pp. 1-20 (Year: 1999).*

* cited by examiner

*Primary Examiner* — Alexander Khong
(74) *Attorney, Agent, or Firm* — KDW FIRM PLLC

(57) ABSTRACT

A method, a system, and a computer program product for generating and using an identifier data model. A first identifier in a plurality of identifiers is assigned to a first version in a plurality of versions of an electronic document processed by a computing system in a plurality of computing systems. A second identifier assigned to a second version the electronic document by the second computing system is received. The second computing system generates the second version of the electronic document by processing the electronic document and assigns the second identifier to the second version of the electronic document. A data model mapping the second identifier to the first identifier is generated and stored. Each identifier included in the data model is associated with a version of the electronic document processed by a computing system in the plurality of computing systems.

20 Claims, 12 Drawing Sheets

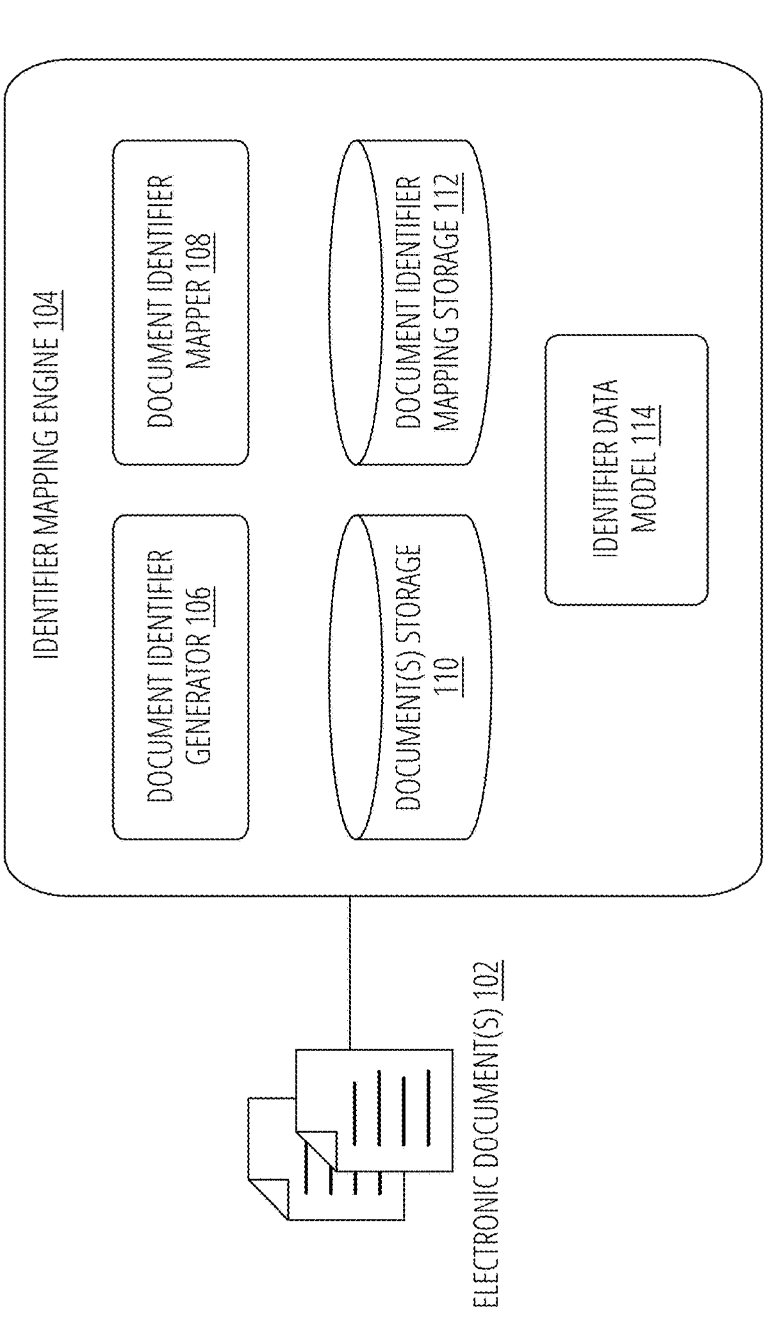
FIG. 1

ASSIGN A FIRST IDENTIFIER IN A PLURALITY OF IDENTIFIERS TO A FIRST VERSION IN A PLURALITY OF VERSIONS OF AN ELECTRONIC DOCUMENT PROCESSED BY A COMPUTING SYSTEM IN A PLURALITY OF COMPUTING SYSTEMS 902

RECEIVE, FROM A SECOND COMPUTING SYSTEM IN THE PLURALITY OF COMPUTING SYSTEMS A SECOND IDENTIFIER IN THE PLURALITY OF IDENTIFIERS ASSIGNED TO A SECOND VERSION THE ELECTRONIC DOCUMENT BY THE SECOND COMPUTING SYSTEM, WHEREIN THE SECOND COMPUTING SYSTEM IS CONFIGURED TO GENERATE THE SECOND VERSION OF THE ELECTRONIC DOCUMENT BY PROCESSING THE ELECTRONIC DOCUMENT AND ASSIGN THE SECOND IDENTIFIER TO THE SECOND VERSION OF THE ELECTRONIC DOCUMENT 904

GENERATE A DATA MODEL MAPPING THE SECOND IDENTIFIER TO THE FIRST IDENTIFIER, WHEREIN EACH IDENTIFIER INCLUDED IN THE DATA MODEL IS ASSOCIATED WITH A VERSION OF THE ELECTRONIC DOCUMENT PROCESSED BY A COMPUTING SYSTEM IN THE PLURALITY OF COMPUTING SYSTEMS, AND STORE THE DATA MODEL 906

COMPUTER-READABLE STORAGE MEDIUM 1002

COMPUTER EXECUTABLE INSTRUCTIONS 1004

FIG. 10

IDENTIFIER MAPPING SYSTEM AND METHOD

BACKGROUND

Identifying versions of electronic documents is important for maintaining accuracy, consistency, and accountability. It ensures that all stakeholders are working with and are provided with the most current information, reducing the risk of errors and miscommunication. Version control also helps in tracking changes, understanding evolution of an electronic document, and restoring previous versions if needed. This is critical in collaborative environments where multiple individuals may be editing the same document, as it helps in managing contributions and resolving conflicts efficiently. However, existing systems typically require use of same document identifiers to identify document version, where such identifiers might not be compatible with every computing system that processed the document, which causes significant monitoring, tracking, and version control issues. Moreover, use of multiple different document identifiers by different existing computing systems significantly complicates control of monitoring and/or tracking of different versions of electronic documents, as it may be difficult to determine which computing systems processed specific versions of electronic documents and/or how electronic documents and/or their versions may be further processed, forward, stored, etc., thereby resulting in a potential loss of data, information, and/or documents.

BRIEF DESCRIPTION OF THE DRAWINGS

To easily identify the discussion of any particular element or act, the most significant digit or digits in a reference number refer to the figure number in which that element is first introduced.

FIG. 1 illustrates an example identifier mapping system for generating one or more identifier data models, according to some embodiments of the current subject matter.

FIG. 9 illustrates an example process for generating and/or using one or more identifier data models, according to some embodiments of the current subject matter.

FIG. 10 illustrates a computer-readable storage medium, according to some embodiments of the current subject matter.

DETAILED DESCRIPTION

Figure 2:
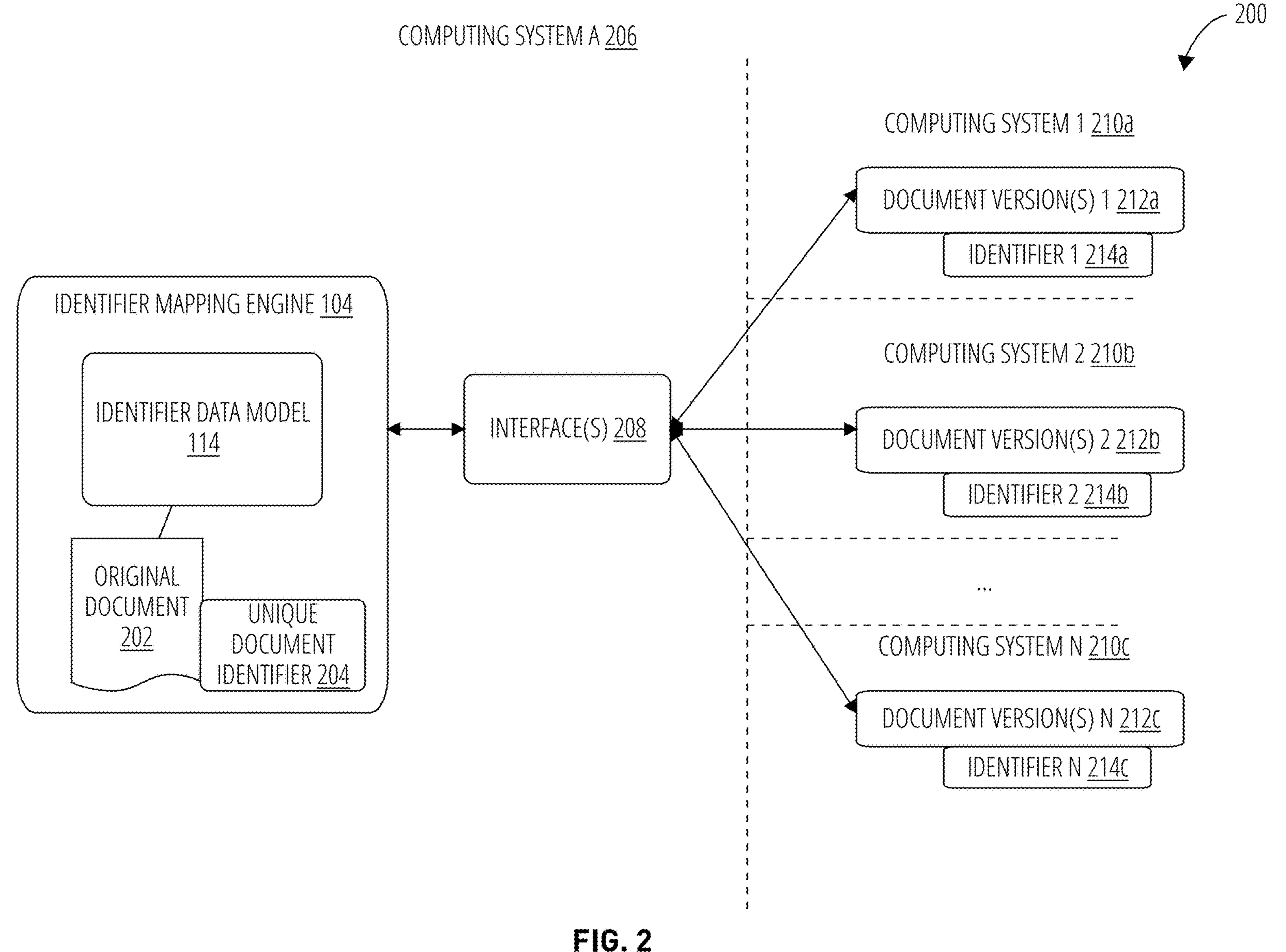
FIG. 2 illustrates an example mapping system, according to some embodiments of the current subject matter.

Embodiments disclosed herein are generally directed to providing identifier data models among computing systems to enable management of electronic documents and/or performing of any other tasks involving data associated with third-party computing systems. In general, a document may include a multimedia record. The term "electronic" may refer to technology having electrical, digital, magnetic, wireless, optical, electromagnetic, or similar capabilities. The term "electronic document" may refer to any electronic multimedia content intended to be used in an electronic form. An electronic document may be part of an electronic record. The term "electronic record" may refer to a contract or other record created, generated, sent, communicated, received, or stored by an electronic mechanism. An electronic document may have an electronic signature. The term "electronic signature" may refer to an electronic sound, symbol, or process, attached to or logically associated with an electronic document, such as a contract or other record, and executed or adopted by a person with the intent to sign the record.

An online electronic document management system provides a host of different benefits to users (e.g., a client or customer) of the system. One advantage is added convenience in generating and signing an electronic document, such as a legally binding agreement. Parties to an agreement can review, revise and sign the agreement from anywhere around the world on a multitude of electronic devices, such as computers, tablets and smartphones.

In some embodiments, the current subject matter relates to providing an identifier mapping engine that may implement a set of tools and/or algorithms to generate an identifier data model for mapping identifiers that may be assigned to electronic documents by various computing systems to a unique document identifier. The electronic document may include legal electronic documents (e.g., agreements, legal pleadings, etc.), non-legal electronic documents (e.g., articles, books, text, etc.), and/or any combinations thereof. The electronic documents may include text(s), audio(s), video(s), image(s), table(s), etc., and/or any combination thereof.

The identifier data model may integrate structured and/or unstructured electronic documents (e.g., electronic agreements, data related to agreements, etc.) from various sources (e.g., computing systems, databases, private data storages, public data storages, etc.). The identifier data model may allow different computing systems to interact with the electronic document irrespective of the specific unique identifier that may be assigned to the electronic document by the document-originating computing system. The identifier data model mapping may map all identifiers that are assigned by each computing system and/or process (whether internal and/or external to the document originating computing system) to the electronic document when such system/process interacts with the document. Each assigned identifier may be mapped to a common or a unique identifier to allow systems/processes that cannot adopt a particular unique identifier to continue using their identifiers.

As one of the benefits of such model, tracking, monitoring, and/or system/process-specific usage of electronic documents defined by the specific identifier assigned by that computing system/process to the document when it interacts with the electronic document may be performed. This is contrary to some of the existing systems, which require all computing systems that wish to interact with and/or process the electronic document to adopt the unique identifier and how it is assigned. Moreover, the identifier data model may be configured to preserve all source identifiers (i.e., identifiers assigned each computing system/process that interacted with or processed the document) in their original form, as assigned by each computing system/process.

As an additional technical benefit, the current subject matter's identifier data model may facilitate traceability and/or auditing across systems. Identifiers of new computing systems/processes that interact with or process the electronic document can be added without impacting existing mappings, e.g., the identifier data model may allow gradual adoption of new identifiers without immediate system overhauls (e.g., this may be especially useful for legacy systems). The identifier data model may support electronic documents involving multiple systems and may simplify identifier reconciliation across multiple computing systems. The identifier data model may centralize identifier mapping logic, thereby reducing complexity for different computing systems and/or processes when interacting with the electronic document. For instance, when one computing system (e.g., a government registry's system, etc.) processes an electronic document and assigns an identifier and/or an additional identifier to it (e.g., a new tax identifier, etc.), the current subject matter's system's identifier data model may be configured to seamlessly integrate the added identifier/additional identifier without affecting existing identifiers that have been assigned to the electronic document. This may allow expansion of the identifier data model without affecting its ability to unify all identifiers (whether existing or newly assigned) under the same unique document identifier that has been initially assigned.

The current subject matter's identifier mapping engine may assign an identifier to a version of an electronic document, e.g., a first or original version of the electronic document (e.g., a lease agreement) that may be processed by a computing system. The identifier may be a unique electronic document identifier (e.g., UUID) and/or be any type of identifier, which may include any string of alpha-numeric characters, code, and/or any other information, data, etc., and/or be any combination thereof (e.g., "[ID1]" identifier assigned to an electronic lease agreement by a computing system generating the lease agreement). Alternatively, or in addition, the identifier may be a complex structure, a partial reference, a hash-based identifier, a block reference, a content-based identifier, a cryptographic identifier, and/or any other type of identifier, and/or any combinations thereof. The assigned identifier may be used as a root or mapping node in an identifier data model to which other identifiers may be mapped to and/or linked with, so that interactions by various computing systems with the electronic document may be tracked and/or monitored. To generate the identifier data model, the identifier mapping engine may receive another identifier, e.g., "[ID2]" identifier assigned by another computing system where execution or signing of the lease agreement was performed by the parties to the lease agreement. Upon receiving the second identifier from such second computing system, the identifier mapping engine may associate the received second identifier (e.g., "[ID2]") with the unique identifier (e.g., "[ID1"]) that was assigned to the electronic document by the first computing system. The identifier mapping engine may then generate an identifier data model that may map the second identifier to the first identifier. In the model, each identifier may, for example, be represented as a node. Moreover, in the identifier data model, each identifier may be associated with a version of the electronic document processed by a particular computing system (e.g., "[ID1]" is associated with an original version of the lease agreement as generated by the first computing system, and "[ID2]" is associated with a signed version of the lease agreement).

The identifier data model may be updated upon receipt of further identifiers that may have been assigned by computing systems after each interaction with and/or processing of the electronic document. For instance, in the identifier data model, a newly received identifier may be associated with the unique identifier (e.g., "[ID1]") and/or with another identifier (e.g., "[ID2]"). The identifier data model may be a tree-like model, a hierarchical model, and/or any other type of model.

The identifier data model may be used to retrieve specific versions of electronic document associated with a particular identifier. For instance, the signed lease agreement may be identified by a particular identifier (e.g., "[ID2]") and thus, using this identifier, the signed lease agreement may be retrieved and provided to the computing system (whether it is the system that assigned the identifier and/or any other computing system). Alternatively, or in addition, other computing systems may be prevented from receiving versions of electronic document without presenting a proper identifier and/or identifier that has been assigned by those computing systems. For retrieval of a specific version of the electronic document, the computing systems may generate a request or a query to access the electronic document (and/or specific version of the document). The identifier data model may then be used to determine a specific identifier associated with a version of the electronic document processed and/or requested by the requesting computing system. The version of the electronic document associated with the identifier may then be provided to that computing system. One or more interfaces (e.g., application programming interfaces, etc.) may be used for requesting and/or providing specific versions of electronic document to computing systems.

Moreover, any additional data (e.g., new versions of electronic document (e.g., a signed lease agreement, etc.), revisions and/or modifications to electronic document and/or versions thereof) may be associated with the electronic document and/or any version thereof and may be assigned an identifier. The additional data may be generated by any computing system. The identifier may be the same identifier as has been originally assigned to the electronic document and/or may be a new identifier that may be associated with the unique identifier in the identifier data model.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application, or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items may be distinct, or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an example identifier mapping system 100 for generating one or more identifier data models, according to some embodiments of the current subject matter. The system 100 may include an identifier mapping engine 104, which may include a document identifier generator 106, a document identifier mapper 108, a document(s) storage 110, a document identifier mapping storage 112, and identifier data model 114. The system 100 may include various other computing components that may be configured to support operation of the identifier mapping engine 104 in identifier data models.

In some embodiments, the identifier mapping engine 104 may be configured to receive one or more electronic document(s) 102 for processing and assigning one or more identifiers. The electronic document(s) 102 may be received from one or more computing systems and/or processes. The computing system(s) may be used to generate the electronic document(s) 102 and/or interact with/process it (e.g., modifying the electronic document, date-stamping the document, signing the document, etc.). Multiple identifiers may be assigned by the same computing system, e.g., upon each interaction with/processing of the electronic document. Alternatively, or in addition, the electronic document may be assigned and may retain the same identifier assigned by the computing system each time the computing system interacts/processes the electronic document. The identifier(s) may be any sequence of alpha-numeric characters, a code, and/or any other type of identifiers. Alternatively, or in addition, the identifier may be a complex structure, a partial reference, a hash-based identifier, a block reference, a content-based identifier, a cryptographic identifier, and/or any other type of identifier, and/or any combinations thereof. As discussed herein, the identifiers may be arranged using the identifier data model 114. In particular, each identifier received from each computing system that interacted with and/or processed the electronic document may be mapped and/or linked to a unique identifier that has been assigned by the identifier mapping engine 104 to the electronic document(s) 102.

In some embodiments, the identifier mapping engine 104 may also implement one or more machine learning (ML) models, which may be used by the engine 104 during and/or for the purposes of generation of identifiers and/or identifier data models, etc. The ML models may be trained based on historical data associated with historical identifiers received from computing systems and/or historical identifier data models. Such historical data may include identifiers that may have been assigned to documents, identifier data models, etc.

One or more components of the system 100 shown in FIG. 1 may be communicatively coupled using one or more communications networks. The communications networks may include one or more of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Further, one or more components of the system 100 may include any combination of hardware and/or software. In some embodiments, one or more components of the system may be disposed on one or more computing devices, such as, server(s), database(s), personal computer(s), laptop(s), cellular telephone(s), smartphone(s), tablet computer(s), virtual reality devices, and/or any other computing devices and/or any combination thereof. In some example embodiments, one or more components of the system may be disposed on a single computing device and/or may be part of a single communications network. Alternatively, or in addition to, such devices may be separately located from one another. A device may be a computing processor, a memory, a software functionality, a routine, a procedure, a call, and/or any combination thereof that may be configured to execute a particular function associated with interface and/or document certification processes disclosed herein.

In some embodiments, one or more components of the system 100 may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system also may be mobile computing devices, for example, an iPhone, iPod, iPad from Apple® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system 100 may include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the interface and/or document certification functions described herein. One or more components of the system may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some example embodiments, one or more components of the system 100 may execute one or more applications, such as software applications, that enable, for example, network communications with one or more components of system and transmit and/or receive data.

One or more components of the system 100 may include and/or be in communication with one or more servers via one or more networks and may operate as a respective front-end to back-end pair with one or more servers. One or more components of the system may transmit, for example from a mobile device application (e.g., executing on one or more user devices, components, etc.), one or more requests to one or more servers. The requests may be associated with retrieving data from servers (e.g., retrieving one or more electronic documents from one or more document storage sources, retrieval of identifier data models, etc.). The servers may receive the requests from the components of the system. Based on the requests, servers may be configured to retrieve the requested data from one or more storage locations. Based on receipt of the requested data from the databases, the servers may be configured to transmit the received data to one or more components of the system, where the received data may be responsive to one or more requests.

The system 100 may include one or more networks, such as, for example, networks that may be communicatively coupling the engine 104 and/or any other computing components. In some embodiments, networks may be one or more of a wireless network, a wired network or any combination of wireless network and wired network and may be configured to connect the components of the system and/or the components of the system to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 802.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, such as credit card association networks, and home networks.

The system 100 may include one or more servers, which may include one or more processors that may be coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system.

Further, one or more components of the system 100 may be configured to execute one or more actions using one or more containers. In some embodiments, each action may be executed using its own container. A container may refer to a standard unit of software that may be configured to include the code that may be needed to execute the action along with all its dependencies. This may allow execution of actions to run quickly and reliably.

In some embodiments, the system 100 may be configured to generate identifier data models for mapping identifiers assigned by various computing system to electronic documents and/or versions of electronic documents. The documents may be generated by the system 100 and/or received from one or more storage locations and/or one or more computing systems (not shown in FIG. 1). For example, some data storages may be configured to be one or more private databases, access to which might not be publicly available (e.g., internal company databases, specific user access databases, etc.). The electronic documents stored in these databases may be organized in a predetermined fashion, which may allow case of access to the electronic documents and/or any portions thereof. For example, electronic documents stored in these databases may be labeled, searchable, and/or otherwise, easily identifiable. The documents may be stored in a particular electronic format (e.g., PDF, .docx, etc.). The electronic documents may be structured and/or unstructured.

Other data storage sources may be configured to be public non-government databases, government databases (e.g., SEC-EDGAR, etc.), etc. and may store various electronic documents, such as, for example, legal documents (e.g., commercial contracts, lease agreements, public disclosures (e.g., 10 k statements, 5 k statements, quarterly reports, etc.)), non-legal documents (e.g., articles, books, etc.). The electronic documents stored in these databases may be identified using various identifiers, which may allow location of these documents in the databases, however, contents of electronic documents stored therein might not be parsed and/or specifically identified. For example, a review of the entire electronic document (e.g., 10*k* statement of a company stored in SEC-EDGAR database) may need to be performed to identify a particular section (e.g., a section related to compensation of executives for the company).

The electronic documents may be any type of documents, such as, for example, agreements, applications, websites, video files, audio files, text files, images, graphics, tables, spreadsheets, computer programs, etc. The documents may be in any desired format, e.g., .pdf, .docx, .xls, and/or any other type of format. The documents may also have any desired size. Moreover, the documents may be organized in any desired fashion. In some examples, documents may be nested within other documents (e.g., one document embedded in another document); one document may be linked to another document, etc.

In some embodiments, electronic documents may include one or more portions. Examples of such portions may include pages, headings, sub-headings, sections, paragraphs, sentences, tables, images, parties, conditions, terms, specific descriptions, and/or any other type of entities. One or more portions may also be associated and/or assigned one or more functions (e.g., a document title, a text heading, a text paragraph, etc.). The documents may be structured in a particular way (e.g., a lease agreement may include a section identifying parties, a section identifying leased premises, a section describing rent being paid, etc.). The documents may also be unstructured.

As shown in FIG. 1, the document identifier generator 106 of the identifier mapping engine 104 may be configured to receive electronic document(s) 102 and generate one or more identifiers for assignment to the electronic document(s) 102. For instance, the electronic document(s) 102 may be a lease agreement that may have been generated by a first computing system (e.g., lessor's computing system). The identifier mapping engine 104 may be part of the first computing system and/or be part of a separate computing system. The document identifier generator 106 may be configured to assign a unique document identifier (UUID) to the electronic document(s) 102. The assigned unique document identifier may be stored in the document identifier mapping storage 112 with the electronic document (and/or any of its versions) may be stored in the document(s) storage 110. In some embodiments, document(s) storage 110 and document identifier mapping storage 112 may be separate storage locations and/or be a single storage location. Moreover, the document(s) storage 110 and/or document identifier mapping storage 112 may be part of the identifier mapping engine 104 and/or be separately located from the identifier mapping engine 104.

The identifier mapping engine 104 may also generate the identifier data model 114 that may be centered around the unique document identifier that has been assigned to the electronic document(s) 102. Each electronic document(s) 102 may be associated with its identifier data model 114. Alternatively, or in addition, identifier data model 114 may be associated with multiple electronic document(s) 102. The identifier data model 114 may be stored in one or more of the document(s) storage 110 and/or document identifier mapping storage 112. The assigned identifier may be a root node and/or a mapping node in the identifier data model 114. Any other identifiers received by identifier mapping engine 104 may be mapped to and/or linked with the unique document identifier. As discussed herein, this way, the identifier data model 114 may be used to track and/or monitor all interactions with the electronic document(s) 102 by different computing systems.

In some embodiments, the assigned identifier may be assigned to a specific version of the electronic document(s) 102. In instances, the specific version may be a first and/or original version of the electronic document(s) 102. In the above example of the lease agreement, a computing system associated with the lessor may be used to generate a first and/or original version of the lease agreement. The unique document identifier assigned to that version may be designated as "[ID1]". As can be understood, any other type of identifier may be assigned to the electronic lease agreement.

The electronic document(s) 102 may be provided to other computing systems for processing. For example, the lease agreement may be provided to a computing system associated with a lessee, which may use another computing system to sign the lease agreement. Each computing system may be configured to assign its own identifier upon processing the document. For instance, the computing system that is used for signing the lease agreement may assign an identifier "[ID2]". The identifier assigned by the computing system where execution or signing of the lease agreement was performed by the parties to the lease agreement may then be provided to the document identifier mapper 108. Upon receiving the "[ID2]" identifier from that computing system, the document identifier mapper 108 may associate, link, and/or map the received identifier "[ID2]" with the unique document identifier "[ID1]". Moreover, the signed version of the lease agreement may be provided to identifier mapping engine 104 for storage in the document(s) storage 110. The lease agreement may be processed by other computing systems, each of which may be configured to assign their own identifiers and provide such identifiers and versions of the lease agreement to identifier mapping engine 104.

Once all identifiers have been collected, the identifier mapping engine 104 may be configured to generate an identifier data model 114. The identifier data model 114 may map the received identifiers (e.g., "[ID2]", etc.) to the unique document identifier, i.e., "[ID1]". In some example, non-limiting, embodiments, the identifier data model 114 may include one or more nodes, where each node, other than the node containing unique document identifier (i.e., "[ID1]"), may include a received identifier (e.g., "[ID2]", etc.), and each node may be linked to the node containing unique document identifier. The nodes may also be associated with respective versions of the electronic document(s) 102 that the identifiers represent (e.g., "[ID1]" is associated with an original version of the lease agreement as generated by the lessor's computing system, and "[ID2]" is associated with a signed version of the lease agreement generated by the signing computing system).

In some embodiments, the identifier data model may be updated upon receipt of further identifiers that may have been assigned by computing systems after each interaction with and/or processing of the electronic document. The updating may be performed on continuous basis. For example, a new identifier, e.g., "[ID3]", which may be received from a third computing system (e.g., a government database system that registers all lease agreements) may be associated with the unique document identifier (e.g., "[ID1] ") and/or with the identifier that has been previously mapped and/or linked to the unique document identifier (e.g., "[ID2] "). This may allow continuous updating and/or expanding of the identifier data model 114 upon receipt of new identifiers, new versions of electronic document(s) 102, and/or additional data related to electronic document(s) 102. The identifier data model 114 may be arranged as a tree-like model, a hierarchical model, and/or any other type of model.

The identifier mapping engine 104 may be configured to respond to requests to retrieve specific versions of electronic document(s) 102 by computing systems. The identifier mapping engine 104 may use the identifier data model 114 to retrieve specific versions of electronic document associated with a particular identifier upon receiving appropriate requests or queries from computing systems. Specifically, computing systems may use assigned identifiers, as part of the requests/queries, to retrieve the electronic document(s) 102. For instance, lessor's computing system may request, using identifier "[ID1]", retrieval of the original version of the lease agreement). The signed lease agreement may be retrieved by the identifier mapping engine 104 using identifier "[ID2]". Retrieval of specific versions of electronic document(s) 102 may be restricted based on the identifiers that have been assigned. For instance, a computing system that has not assigned a specific identifier to electronic document(s) 102 may be prevented from retrieval of a version of electronic document(s) 102 associated with that specific identifier.

For retrieval, the identifier mapping engine 104 may access identifier data model 114 to determine a specific identifier associated with a specific version of the electronic document processed and/or requested by the requesting computing system. The version of the electronic document associated with the identifier may then be retrieved from document(s) storage 110 and provided to the requesting computing system. One or more interfaces (e.g., application programming interfaces, etc.) may be used for requesting and/or providing specific versions of electronic document to computing systems.

FIG. 2 illustrates an example mapping system 200, according to some embodiments of the current subject matter. The mapping system 200 may include a computing system A 206 and a plurality of computing systems 210 (*a, b, . . . , c*) (e.g., computing system 1 210*a*, computing system 2 210*b*, . . . , computing system N 210*c*), which may be computing systems that are external to the computing system A 206 and may be communicatively coupled to the computing system A 206 using any desired communication connections (e.g., wired, wireless, etc.). The computing system A 206 and the external computing systems 210 may be connectable using interface(s) 208. The systems 206 and 210 may be connected for the purposes of exchanging of various data, electronic documents (including their respective identifiers), applications, capabilities, etc. and/or for the purposes of performing various tasks (e.g., generating and signing of lease agreements, etc.). In some embodiments, the identifier data model may integrate and/or invoke and/or may be integrated and/or invoked through a plurality of computing systems that may be connected using one or more connection frameworks that may be implemented using one or more connection data models that may define various connectivity capabilities among such computing systems. This may allow accessing of additional electronic documents, capabilities, etc., thereby enhancing abilities of the identifier data model to incorporate document identifiers from different computing systems, thereby improving monitoring and/or tracking of electronic documents and/or versions thereof.

The computing system A 206 may include identifier mapping engine 104 along identifier data model 114. Alternatively, or in addition, the identifier mapping engine 104 may be separately located from the computing system A 206. The identifier mapping engine 104 may include one or more identifier data models 114 that may be generated and/or used in connection with tracking and/or monitoring electronic document(s) 102 and/or versions thereof.

As discussed herein, the identifier data model 114 may be generated using one or more identifiers that may have been assigned by one or more computing systems 206 and/or 210. Each identifier data model 114 may include a unique document identifier assigned to a particular electronic document(s) 102 that may be mapped and/or linked to one or more identifiers assigned to the same electronic document(s) 102 by each computing system 210 that is configured to process the electronic document(s) 102.

As shown in FIG. 2, to generate identifier data model 114, the computing system A 206, and in particular, its identifier mapping engine 104, may be configured to receive identifiers and/or associated versions of electronic document(s) 102 from computing systems 210. In the lease agreement example, the original document 202 may be configured to generate and/or be provided with an original document 202 corresponding to the original lease agreement. In this case, the computing system A 206 may be a computing system associated with the lessor in the lease agreement. Alternatively, or in addition, the computing system A 206 may be any third-party computing system that may generate and/or may be used to generate the original document 202.

The identifier mapping engine 104 of the computing system A 206 may be configured to assign a unique document identifier 204 to the original document 202. The unique document identifier 204 may uniquely identify the original document 202 either within the unique document identifier 204 and/or within any other computing system. The unique document identifier 204 may be any type of code, alphanumeric sequence of characters, and/or any other type of identifier. Alternatively, or in addition, the identifier may be a complex structure, a partial reference, a hash-based identifier, a block reference, a content-based identifier, a cryptographic identifier, and/or any other type of identifier, and/or any combinations thereof.

The original document 202 may be provided (e.g., via interface(s) 208) to one or more computing systems 210. For example, the original document 202 may be provided to computing system 1 210*a*, which may be associated with a lessee. The computing system 1 210*a* may process original document 202 and generate a document version(s) 1 212*a*, which may correspond to an edited version of the original document 202 or simply a version of document stored (permanently and/or temporarily) by the computing system 1 210*a*. The computing system 1 210*a* may assign identifier 1 214*a* to the document version(s) 1 212*a*. The identifier 1 214*a* may be different from the unique document identifier 204 assigned by the identifier mapping engine 104. The computing system 1 210*a* may also provide the identifier 1 214*a* to the identifier mapping engine 104 (via interface(s) 208). The identifier 1 214*a* may be provided along with the document version(s) 1 212*a* and/or separately.

Similarly, original document 202 may also be provided to computing system 2 210*b*, which may be a government database that stores information about real property and that may be needed for completion of the original document 202. The computing system 2 210*b* may process original document 202 and generate a document version(s) 2 212*b*, which may correspond to a version of original document 202 that include requisite real property information. Alternatively, or in addition, computing system 1 210*a* may be configured to provide original document 202 and/or document version(s) 1 212*a* to the computing system 2 210*b* for processing, which may be accomplished using interface(s) 208 and/or any other inter-computing-systems interfaces. The computing system 2 210*b* may assign identifier 2 214*b* to the document version(s) 2 212*b*. The identifier 2 214*b* may be different from the unique document identifier 204 and/or identifier 1 214*a*. The computing system 2 210*b* may also provide the identifier 2 214*b* to the identifier mapping engine 104 (via interface(s) 208). The identifier 2 214*b* may also be provided along with the document version(s) 2 212*b* and/or separately.

Once the parties to the lease agreement have completed negotiation process, the original document 202 and/or any of its versions, document version(s) 1 212*a*, 212*b*, etc., may be provided to the signing computing system, e.g., computing system N 210*c*, where execution of the lease agreement may take place. Similar to the computing systems 210*a*, 210*b*, etc., the computing system N 210*c* may be configured to assign its own identifier N 214*c* to the latest version of the document, e.g., document version(s) N 212*c*. The identifier N 214*c* and/or document version(s) N 212*c* may likewise be provided to identifier mapping engine 104.

Once the identifiers 214*a*, 214*b*, . . . , 214*c* and/or corresponding document versions 212*a*, 212*b*, . . . , 212*c* are provided to the identifier mapping engine 104 of the computing system A 206, the identifier mapping engine 104 may be configured to generate the identifier data model 114, where each of the identifiers 214 may be mapped to and/or linked to the unique document identifier 204. The identifier data model 114 may be represented as a tree-like structure, a hierarchical structure, a graph structure, and/or any other type of structure. The identifier data model 114 may be continuously updated with new identifiers 214 corresponding to further versions of electronic documents. Each of the newly received identifiers 214 may be mapped and/or linked to the unique document identifier 204.

In some embodiments, the computing system A 206 may store one or more identifier data model 114 in the document identifier mapping storage 112 and/or any other storage location. The computing system A 206 may also update such stored identifier data model 114 upon receipt of further identifiers and/or any other data, metadata, information, etc. The system 206 may also store further versions of electronic document(s) 102 (in document(s) storage 110) with which newly received identifiers are associated. The system 206 may also store data, information, etc. associated with identifier data model 114 and/or versions of electronic document(s) 102 based on the stored identifier data model 114.

The identifier data model 114 may be used to retrieve specific versions of documents. For instance, the computing system 1 210*a* may wish to retrieve its version of the original document 202, i.e., document version(s) 1 212*a*. To do so, the computing system 1 210*a* may generate a request and/or query, via interface(s) 208, to the computing system A 206. The request/query may include identifier 1 214*a* corresponding to the document version(s) 1 212*a*. Upon receipt of the request/query, the identifier mapping engine 104 may retrieve an appropriate identifier data model 114 and use the identifier 1 214*a* to determine which version of the document is being sought. Once the version of the document has been determined, the identifier mapping engine 104 may access document(s) storage 110 to retrieve the desired document version and provide it (e.g., via interface(s) 208) to the computing system 1 210*a*. In some example embodiments, the computing systems 210 may be prevented from accessing versions of documents without identifiers and/or with incorrect identifiers. For instance, the computing system 2 210*b* may be prevented from accessing document version(s) 1 212*a* generated by computing system 1 210*a*, as computing system 2 210*b* did not generate document version(s) 1 212*a* and hence, does not have the identifier 1 214*a* to access document version(s) 1 212*a*. Alternatively, or in addition, computing systems 206 and/or 210 may be allowed to access any version of documents as long as proper identifiers 204 and/or 214 are included in the requests/queries. In some embodiments, access to certain version of electronic documents by computing systems may be controlled using various credential-based, token-based, etc. protocols and/or any other security features. For instance, if one computing system does not have certain credentials, tokens, etc. associated with a particular document identifier assigned to a document, such computing system may be prevented from retrieving the version associated and/or mapped to that identifier.

Figure 3:
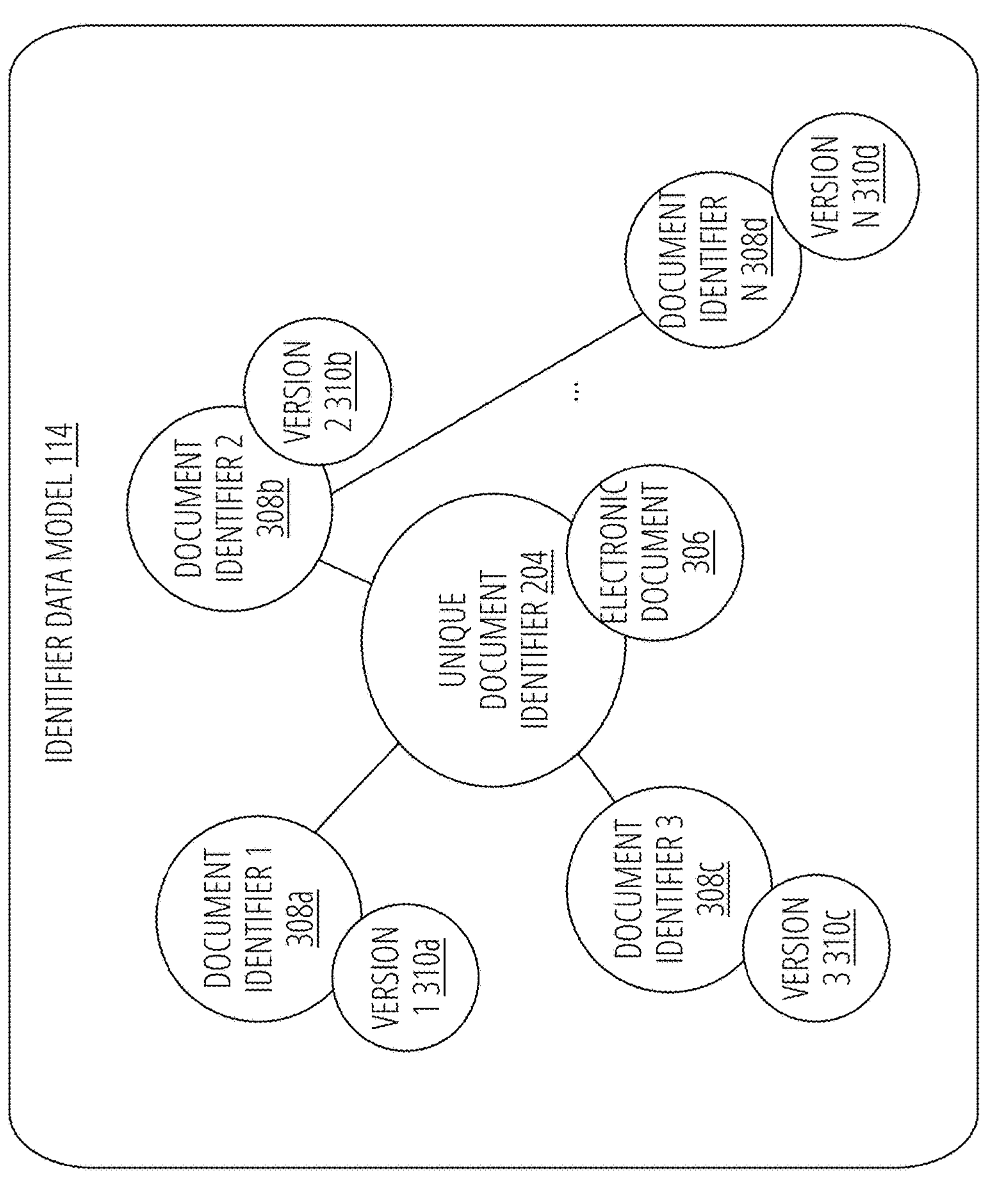
FIG. 3 illustrates an example identifier data model, according to some embodiments of the current subject matter.

FIG. 3 illustrates an example identifier data model 114, according to some embodiments of the current subject matter. The identifier data model 114 may be generated as a result of each system 206 and/or 210 generating versions of documents and may further be used for retrieval of electronic documents by computing systems 206 and/or 210.

The identifier data model 114 may be generated using unique document identifier 204 and one or more document identifiers 1, 2, 3, . . . . N 308 (*a, b, c, . . . , d*). The identifier data model 114 may include one or more nodes. Each node in the identifier data model 114 may include an identifier. Each identifier may be linked and/or contain a reference to a corresponding version of electronic document. For instance, the node containing unique document identifier 204 may be a root node or a mapping node and may be associated with electronic document 306 (e.g., an original version of the electronic document); the node containing document identifier 1 308*a* may be a subsequent node and may be associated with version 1 310*a*, where document identifier 1 308*a* may be a subsequently assigned identifier; the node containing document identifier 2 308*b* may be a subsequent node and may be associated with version 2 310*b*, where document identifier 2 308*b* may be another subsequently assigned identifier; etc. As discussed herein, the identifier data model may be a hierarchical structure, a tree structure, a graph structure, and/or any other structure and/or any combinations thereof.

In the lease agreement example, document identifier 1 308*a* may be associated with a version of the lease agreement received and processed by the computing system associated with the lessee; document identifier 2 308*b* may be associated with a version of the lease agreement that has been supplemented with real estate record information from one or more government databases; etc. In some embodiments, in the identifier data model 114, the document identifier N 308*d* may be linked with document identifier 2 308*b* rather than directly to the node containing unique document identifier 204. For instance, the government database computing system containing real-estate records may have provided the lease agreement to another government database computing system that may contain tax records for the property being leased. The latter computing system supplemented the lease agreement with appropriate information and thus, generated version N 310*d* and assigned document identifier N 308*d* to such version. As can be understood, any other arrangements and/or structural representations of the identifier data model 114 are possible.

Figure 4:
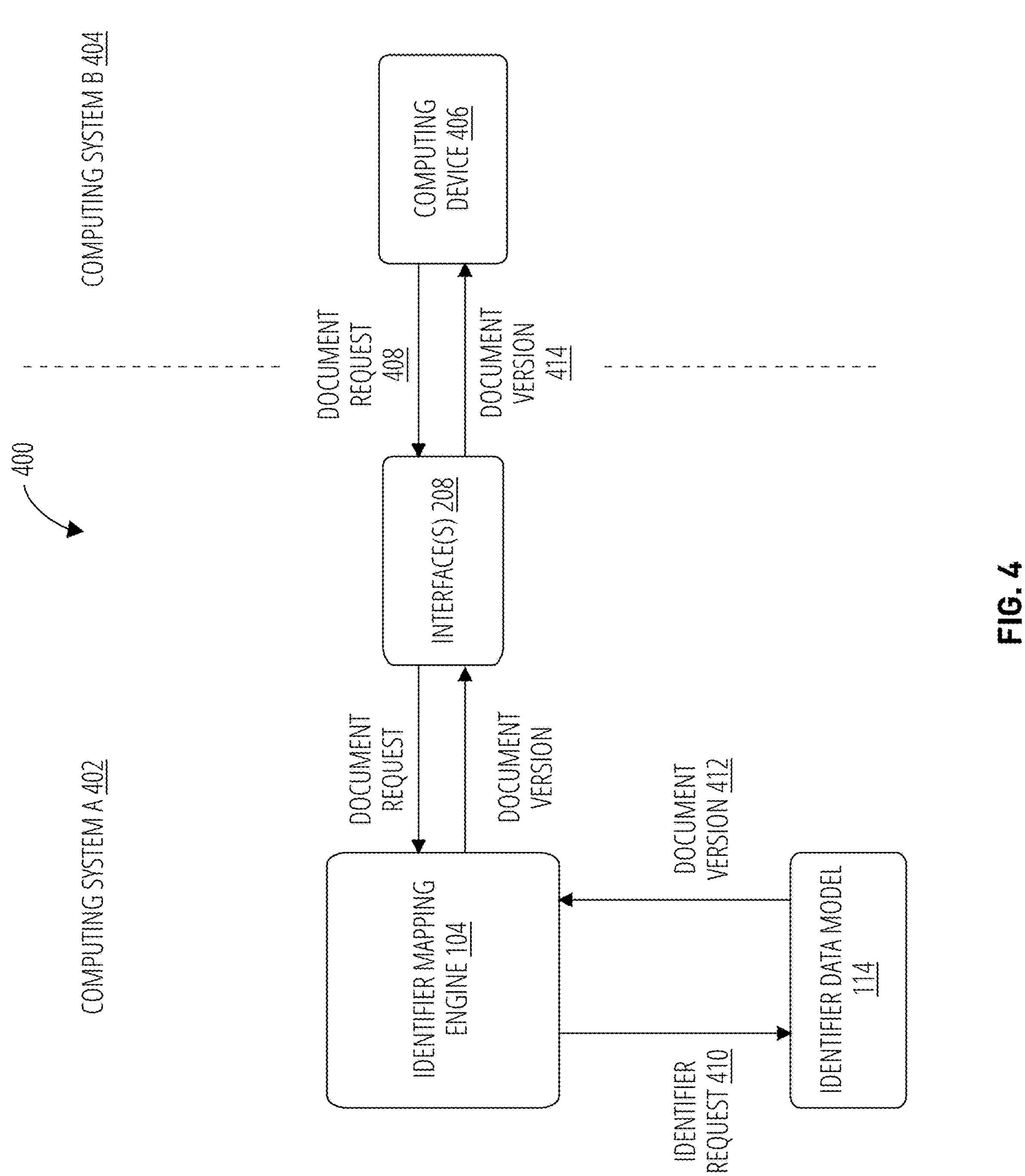
FIG. 4 illustrates an example identifier mapping system, according to some embodiments of the current subject matter.

FIG. 4 illustrates an example identifier mapping system 400, according to some embodiments of the current subject matter. The identifier mapping system 400 may provide connection, using one or more interfaces, between computing system A 402 and computing system B 404. The computing system B 404 may be external to the computing system A 402. Each computing system may have its own computing environments, requirements, software applications, data storages, data, etc.

The computing system B 404 may include a computing device 406 (e.g., a mobile device, a stationary computing device, etc.). The computing system A 402 may include the identifier mapping engine 104, and the identifier data model 114 among its various other computing components (not shown in FIG. 4). In some embodiments, a user of the computing device 406 may generate a document request 408. The document request 408 may be received by the computing system A 402 and processed by the identifier mapping engine 104. The document request 408 may include a request to access a version of the document and may include an identifier that corresponds to the requested document version.

The identifier mapping engine 104 may determine that for completion of the request, the identifier data model 114 may need to be accessed. Using information (which may include an identifier assigned to the document version by the computing system B 404) from the request, the identifier mapping engine 104 may generate an identifier request 410 to identifier data model 114. The identifier data model 114 may use the provided identifier to determine that document version 412 may correspond to the requested version and return same to identifier mapping engine 104. For example, in the lease agreement example, the computing system B 404, corresponding to the lessee's computing system, may request an unsigned version of the lease agreement that has been provided to the lessee's computing system.

The identifier mapping engine 104 may then return the requested version (e.g., via interface(s) 208) as document version 414 to the computing device 406. In some embodiments, any of the requests and/or corresponding responses along with document request 408, identifier request 410, document version 412 and/or document version 414 may be stored in a storage location of the computing system A 402. The stored information may be accessed by the computing system A 402 each time a new request is received and/or prior request is revisited by the user of the computing device 406. Further identifier data models may be accessed and/or generated for the purposes of responding to requests from the same computing system B 404 and/or a different external computing system.

Figure 5:
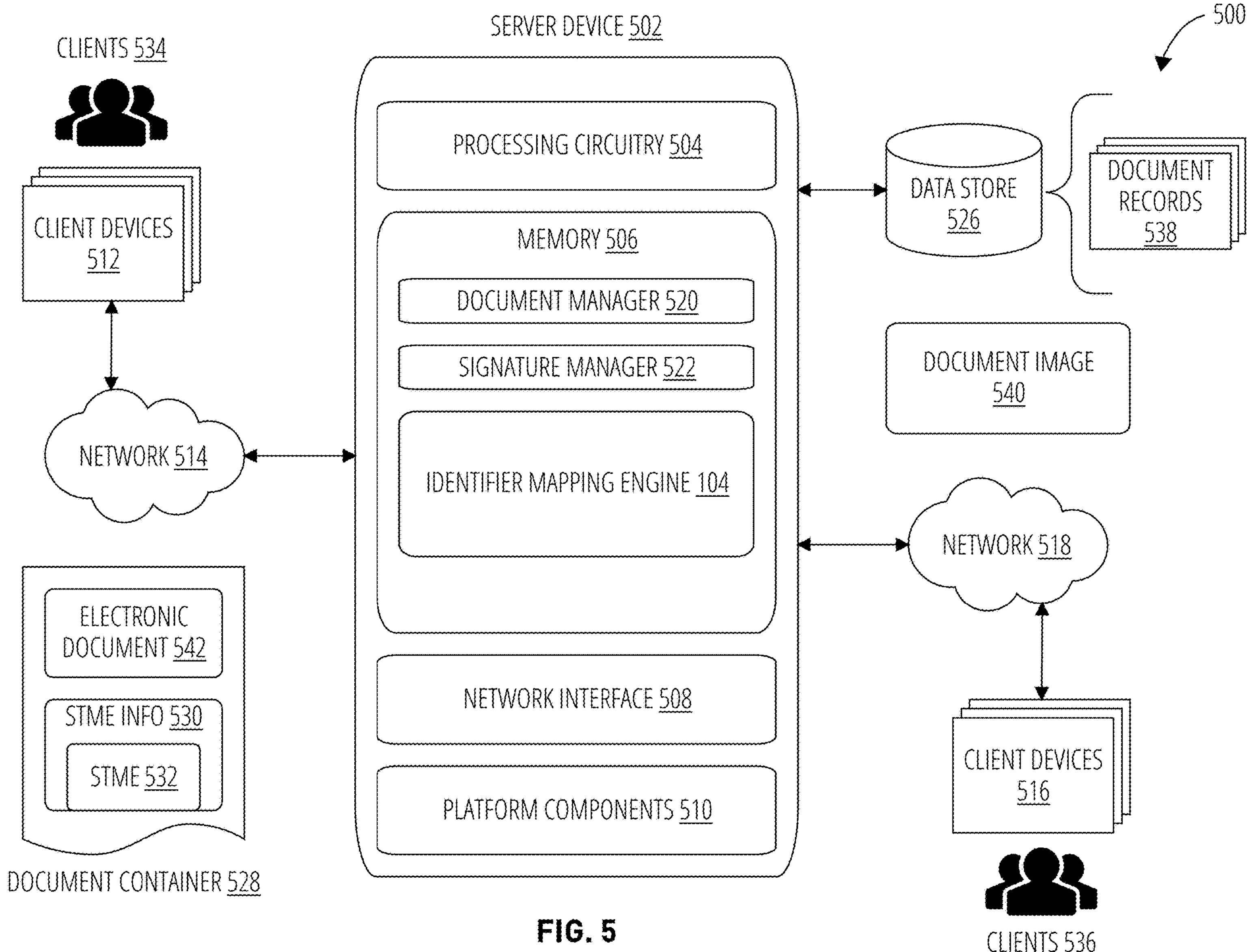
FIG. 5 illustrates an embodiment of a system where the identifier mapping engine may be implemented.

FIG. 5 illustrates an embodiment of a system 500 where identifier mapping engine 104 may be implemented. The system 500 may be suitable for implementing one or more embodiments as described herein. By way of a non-limiting example, the system 500 may comprise an electronic document management platform (EDMP) suitable for managing a collection of electronic documents. An example of an EDMP includes a product or technology offered by DocuSign®, Inc., located in San Francisco, California ("DocuSign"). DocuSign is a company that provides electronic signature technology and digital transaction management services for facilitating electronic exchanges of contracts and signed documents. An example of a DocuSign product is a DocuSign Agreement Cloud that is a framework for generating, managing, signing and storing electronic documents on different devices. It may be appreciated that the system 500 may be implemented using other EDMP, technologies and products as well. For example, the system 500 may be implemented as an online signature system, online document creation and management system, an online workflow management system, a multi-party communication and interaction platform, a social networking system, a marketplace and financial transaction management system, a customer record management system, and other digital transaction management platforms. Embodiments are not limited in this context.

The system 500 may implement an EDMP as a cloud computing system. Cloud computing is a model for providing on-demand access to a shared pool of computing resources, such as servers, storage, applications, and services, over the Internet. Instead of maintaining their own physical servers and infrastructure, companies can rent or lease computing resources from a cloud service provider. In a cloud computing system, the computing resources are hosted in data centers, which are typically distributed across multiple geographic locations. These data centers are designed to provide high availability, scalability, and reliability, and are connected by a network infrastructure that allows users to access the resources they need. Some examples of cloud computing services include Infrastructure-as-a-Service (IaaS), Platform-as-a-Service (PaaS), and Software-as-a-Service (SaaS).

The system 500 may implement various search tools and algorithms designed to search for electronic document(s) and/or collections of electronic documents (which may also be referred to as "transaction documents", "transaction packages", "document packages" or "packages") and/or information within an electronic document or across a collection of electronic documents. Within the context of a cloud computing system, the system 500 may implement a cloud search service accessible to users via a web interface or web portal front-end server system. A cloud search service is a managed service that allows developers and businesses to add search capabilities to their applications or websites without the need to build and maintain their own search infrastructure. Cloud search services typically provide powerful search capabilities, such as faceted search, full-text search, and auto-complete suggestions, while also offering features like scalability, availability, and reliability. A cloud search service typically operates in a distributed manner, with indexing and search nodes located across multiple data centers for high availability and faster query responses. These services typically offer application program interfaces (APIs) that allow developers to easily integrate search functionality into their applications or websites. One major advantage of cloud search services is that they are designed to handle large-scale data sets and provide powerful search capabilities that can be difficult to achieve with traditional search engines. Cloud search services can also provide advanced features, such as machine learning-powered search, natural language processing, and personalized recommendations, which can help improve the user experience and make search more efficient. Some examples of popular cloud search services include Amazon CloudSearch, Elasticsearch, and Azure Search. These services are typically offered on a pay-as-you-go basis, allowing businesses to pay only for the resources they use, making them an affordable option for businesses of all sizes.

In general, the system 500 may allow users to generate, revise and electronically sign electronic documents. When implemented as a large-scale cloud computing service, the system 500 may allow entities and organizations to a mass a significant number of electronic documents, including both signed electronic documents and unsigned electronic documents. As such, the system 500 may need to manage a large collection of electronic documents for different entities, a task that is sometimes referred to as contract lifecycle management (CLM).

As shown in FIG. 5, the system 500 may include a server device 502 communicatively coupled to a set of client devices 512 via a network 514. The server device 502 may also be communicatively coupled to a set of client devices 516 via a network 518. The client devices 512 may be associated with a set of clients 534. The client devices 516 may be associated with a set of clients 536. In one network topology, the server device 502 may represent any server device, such as a server blade in a server rack as part of a cloud computing architecture, while the client devices 512 and the client devices 516 may represent any client device, such as a smart wearable (e.g., a smart watch), a smart phone, a tablet computer, a laptop computer, a desktop computer, a mobile device, and so forth. The server device 502 may be coupled to a local or remote data store 526 to store document records 538. It may be appreciated that the system 500 may have more or less devices than shown in FIG. 5 with a different network topology as needed for a given implementation. Embodiments are not limited in this context.

Figure 11:
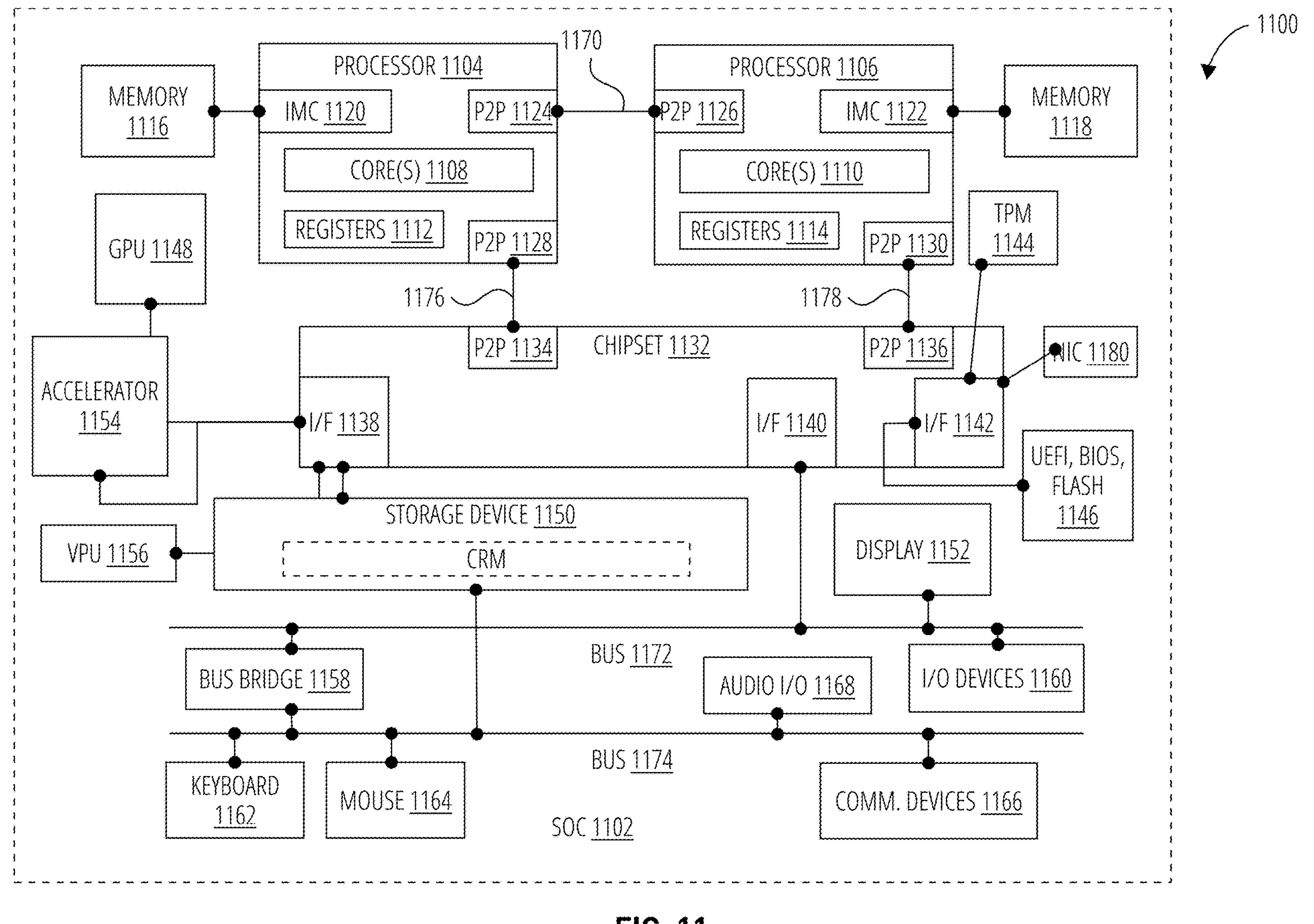
FIG. 11 illustrates a computing architecture, according to some embodiments of the current subject matter.

In various embodiments, the server device 502 may include various hardware elements, such as a processing circuitry 504, a memory 506, a network interface 508, and a set of platform components 510. The client devices 512 and/or the client devices 516 may include similar hardware elements as those depicted for the server device 502. The server device 502, client devices 512, and client devices 516, and associated hardware elements, are described in more detail with reference to a computing architecture 1100 as depicted in FIG. 11.

Figure 12:
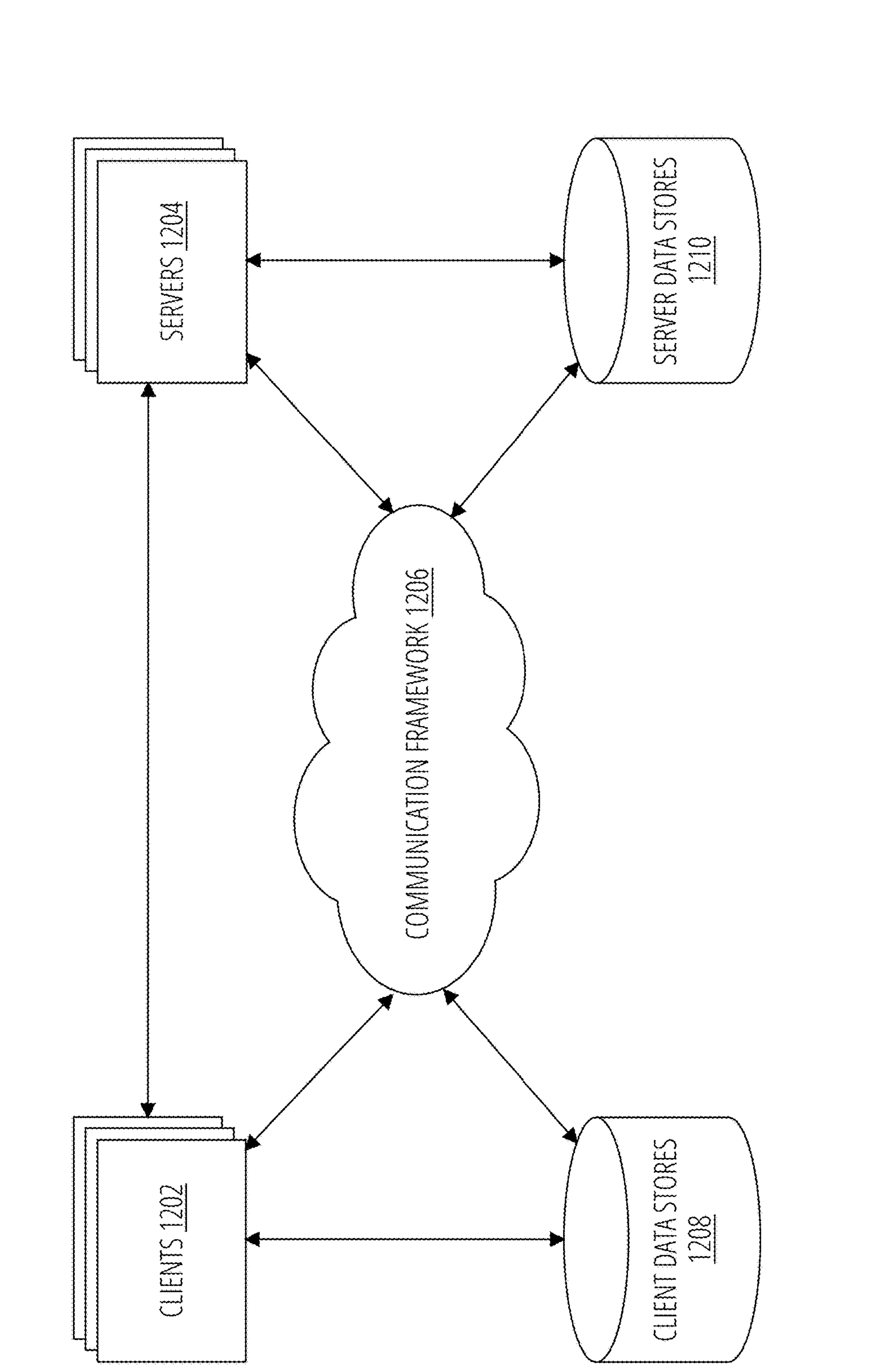
FIG. 12 illustrates a communications architecture, according to some embodiments of the current subject matter.

In various embodiments, the server devices 502, 512 and/or 516 may communicate various types of electronic information, including control, data and/or content information, via one or both network 514, network 518. The network 514 and the network 518, and associated hardware elements, are described in more detail with reference to a communications architecture 1200 as depicted in FIG. 12.

The memory 506 may store a set of software components, such as computer executable instructions, that when executed by the processing circuitry 504, causes the processing circuitry 504 to implement various operations for an electronic document management platform. As depicted in FIG. 5, for example, the memory 506 may include a document manager 520, a signature manager 522, and a document generation engine 550, among other software elements.

The document manager 520 may generally manage a collection of electronic documents stored as document records 538 in the data store 526. The document manager 520 may receive as input a document container 528 for an electronic document. A document container 528 is a file format that allows multiple data types to be embedded into a single file, sometimes referred to as a "wrapper" or "metafile." The document container 528 can include, among other types of information, an electronic document 542 and metadata for the electronic document 542.

A document container 528 may include an electronic document 542. The electronic document 542 may comprise any electronic multimedia content intended to be used in an electronic form. The electronic document 542 may comprise an electronic file having any given file format. Examples of file formats may include, without limitation, Adobe portable document format (PDF), Microsoft Word, PowerPoint, Excel, text files (.txt, .rtf), and so forth. In one embodiment, for example, the electronic document 542 may comprise a PDF created from a Microsoft Word file with one or more workflows developed by Adobe Systems Incorporated, an American multi-national computer software company headquartered in San Jose, California. Embodiments are not limited to this example.

In addition to the electronic document 542, the document container 528 may also include metadata for the electronic document 542. In one embodiment, the metadata may comprise signature tag marker element (STME) information 132 for the electronic document 542. The STME information 530 may include one or more STME 532, which are graphical user interface (GUI) elements superimposed on the electronic document 542. The GUI elements may include textual elements, visual elements, auditory elements, tactile elements, and so forth. In some embodiments, for example, the STME information 530 and STME 532 may be implemented as text tags, such as DocuSign anchor text, Adobe® Acrobat Sign® text tags, and so forth. Text tags are specially formatted text that can be placed anywhere within the content of an electronic document specifying the location, size, type of fields such as signature and initial fields, checkboxes, radio buttons, and form fields; and advanced optional field processing rules. Text tags can also be used when creating PDFs with form fields. Text tags may be converted into signature form fields when the document is sent for signature or uploaded. Text tags can be placed in any document type such as PDF, Microsoft Word, PowerPoint, Excel, and text files (.txt, .rtf). Text tags offer a flexible mechanism for setting up document templates that allow positioning signature and initial fields, collecting data from multiple parties within an agreement, defining validation rules for the collected data, and adding qualifying conditions. Once a document is correctly set up with text tags it can be used as a template when sending documents for signatures ensuring that the data collected for agreements is consistent and valid throughout the organization.

In one embodiment, the STME 532 may be utilized for receiving signing information, such as GUI placeholders for approval, checkbox, date signed, signature, social security number, organizational title, and other custom tags in association with the GUI elements contained in the electronic document 542. A client 534 may have used the client device 512 and/or the server device 502 to position one or more signature tag markers over the electronic document 542 with tools applications, and workflows developed by DocuSign or Adobe. For instance, assume the electronic document 542 is a commercial lease associated with STME 532 designed for receiving signing information to memorialize an agreement between a landlord and tenant to lease a parcel of commercial property. In this example, the signing information may include a signature, title, date signed, and other GUI elements.

The document manager 520 may process a document container 528 to generate a document image 540. The document image 540 is a unified or standard file format for an electronic document used by a given EDMP implemented by the system 500. For instance, the system 500 may standardize use of a document image 540 having an Adobe portable document format (PDF), which is typically denoted by a ".pdf" file extension. If the electronic document 542 in the document container 528 is in a non-PDF format, such as a Microsoft Word ".doc" or ".docx" file format, the document manager 520 may convert or transform the file format for the electronic document into the PDF file format. Further, if the document container 528 includes an electronic document 542 stored in an electronic file having a PDF format suitable for rendering on a screen size typically associated with a larger form factor device, such as a monitor for a desktop computer, the document manager 520 may transform the electronic document 542 into a PDF format suitable for rendering on a screen size associated with a smaller form factor device, such as a touch screen for a smart phone. The document manager 520 may transform the electronic document 542 to ensure that it adheres to regulatory requirements for electronic signatures, such as a "what you see is what you sign" (WYSIWYS) property, for example.

The signature manager 522 may generally manage signing operations for an electronic document, such as the document image 540. The signature manager 522 may manage an electronic signature process to send the document image 540 to signers, obtaining electronic signatures, verifying electronic signatures, and recording and storing the electronically signed document image 540. For instance, the signature manager 522 may communicate a document image 540 over the network 518 to one or more client devices 516 for rendering the document image 540. A client 536 may electronically sign the document image 540 and send the signed document image 540 to the server device 502 for verification, recordation, and storage.

The engine 550 may also implement and/or manage various artificial intelligence (AI) and/or machine learning (ML) agents to assist in various operational tasks for the EDMP of the system 500. The AI/ML agents and their operation associated with the document generation engine 550, and associated software elements. The document generation engine 550, and associated hardware elements, are described in more detail with reference to a computing architecture 1100 as depicted in FIG. 11.

In general operation, assume the server device 502 receives a document container 528 from a client device 512 over the network 514. The server device 502 processes the document container 528 and makes any necessary modifications or transforms as previously described to generate the document image 540. The document image 540 may have a file format of an Adobe PDF denoted by a ".pdf" file extension. The server device 502 sends the document image 540 to a client device 516 over the network 518. The client device 516 renders the document image 540 with the STME 532 in preparation for electronic signing operations to sign the document image 540.

Figure 7:
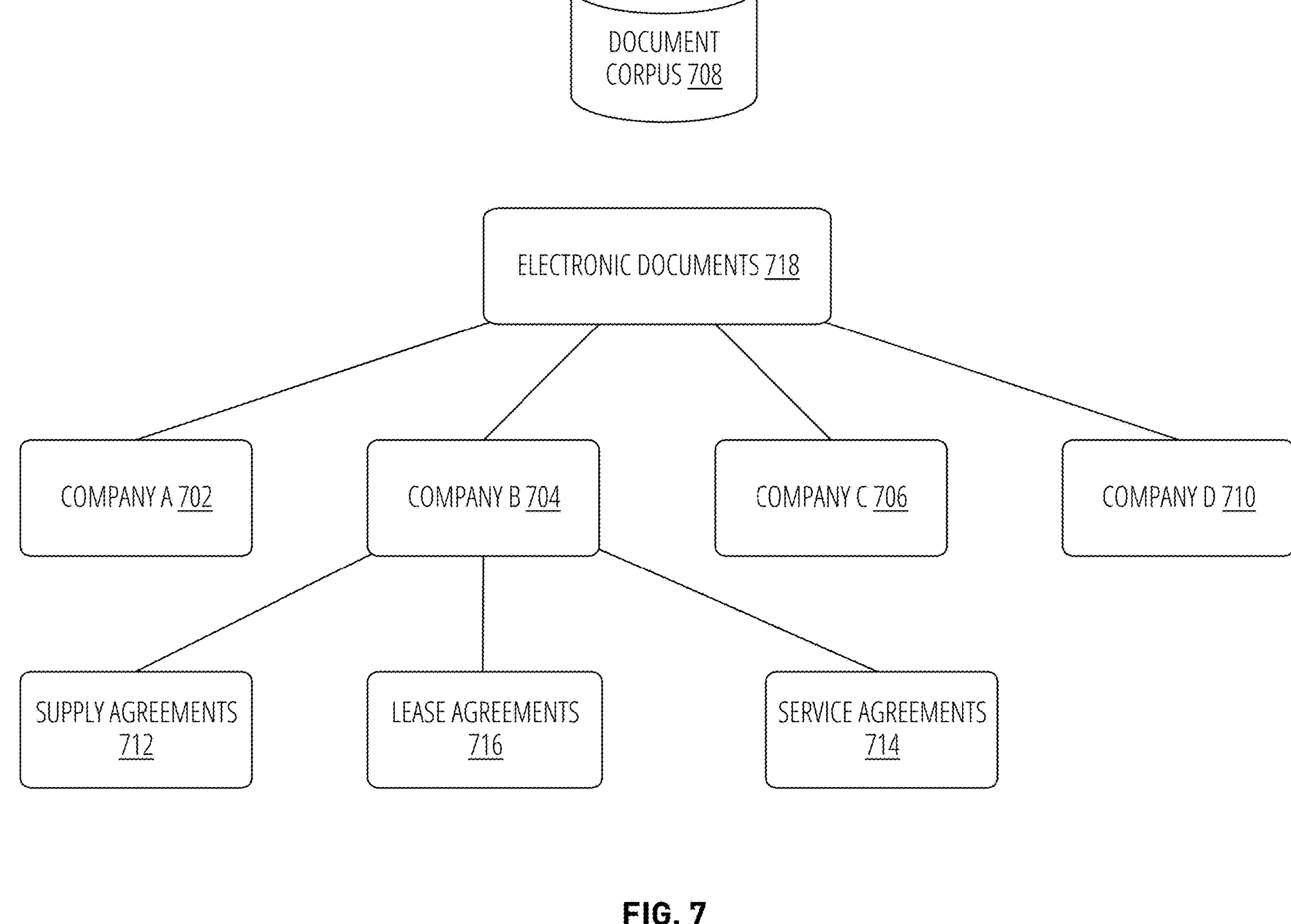
FIG. 7 illustrates a document corpus in accordance with one embodiment.

The document image 540 may further be associated with STME information 530 including one or more STME 532 that were positioned over the document image 540 by the client device 512 and/or the server device 502. The STME 532 may be utilized for receiving signing information (e.g., approval, checkbox, date signed, signature, social security number, organizational title, etc.) in association with the GUI elements contained in the document image 540. For instance, a client 534 may use the client device 512 and/or the server device 502 to position the STME 532 over the electronic documents 718, as shown in FIG. 7, with tools, applications, and workflows developed by DocuSign, Inc. For example, the electronic documents 718 may be a commercial lease that is associated with one or more or more STME 532 for receiving signing information to memorialize an agreement between a landlord and tenant to lease a parcel of commercial property. For example, the signing information may include a signature, title, date signed, and other GUI elements.

Broadly, a technological process for signing electronic documents may operate as follows. A client 534 may use a client device 512 to upload the document container 528, over the network 514, to the server device 502. The document manager 520, at the server device 502, receives and processes the document container 528. The document manager 520 may confirm or transform the electronic document 542 as a document image 540 that is rendered at a client device 516 to display the original PDF image including multiple and varied visual elements. The document manager 520 may generate the visual elements based on separate and distinct input including the STME information 530 and the STME 532 contained in the document container 528. In one embodiment, the PDF input in the form of the electronic document 542 may be received from and generated by one or more workflows developed by Adobe Systems Incorporated. The STME 532 input may be received from and generated by workflows developed by DocuSign. Accordingly, the PDF and the STME 532 are separate and distinct input as they are generated by different workflows provided by different providers.

The document manager 520 may generate the document image 540 for rendering visual elements in the form of text images, table images, STME images and other types of visual elements. The original PDF image information may be generated from the document container 528 including original documents elements included in the electronic document 542 of the document container 528 and the STME information 530 including the STME 532. Other visual elements for rendering images may include an illustration image, a graphic image, a header image, a footer image, a photograph image, and so forth.

The signature manager 522 may communicate the document image 540 over the network 518 to one or more client devices 516 for rendering the document image 540. The client devices 516 may be associated with clients 536, some of which may be signatories or signers targeted for electronically signing the document image 540 from the client 534 of the client device 112. The client device 112 may have utilized various workflows to identify the signers and associated network addresses (e.g., email address, short message service, multimedia message service, chat message, social message, etc.). For example, the client 534 may utilize workflows to identify multiple parties to the lease including bankers, landlord, and tenant. Further, the client 534 may utilize workflows to identify network addresses (e.g., email address) for each of the signers. The signature manager 522 may further be configured by the client 534 whether to communicate the document image 540 in series or parallel. For example, the signature manager 522 may utilize a workflow to configure communication of the document image 540 in series to obtain the signature of the first party before communicating the document image 540, including the signature of the first party, to a second party to obtain the signature of the second party before communicating the document image 540, including the signature of the first and second party to a third party, and so forth. Further for example, the client 534 may utilize workflows to configure communication of the document image 540 in parallel to multiple parties including the first party, second party, third party, and so forth, to obtain the signatures of each of the parties irrespective of any temporal order of their signatures.

The signature manager 522 may communicate the document image 540 to the one or more parties associated with the client devices 516 in a page format. Communicating in page format, by the signature manager 522, ensures that entire pages of the document image 540 are rendered on the client devices 516 throughout the signing process. The page format is utilized by the signature manager 522 to address potential legal requirements for binding a signer. The signature manager 522 utilizes the page format because a signer is only bound to a legal document that the signer is intended to be bound. To satisfy the legal requirement of intent, the signature manager 522 generates PDF image information for rendering the document image 540 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law. The WYSIWYS property recognizes that, unlike a paper document, a digital document is not bound by its medium of presentation (e.g., layout, font, font size, etc.) and a medium of presentation may change the semantic interpretation of its content. Accordingly, the signature manager 522 anticipates a possible requirement to show intent in a legal proceeding by generating original PDF image information for rendering the document image 540 in page format. The signature manager 522 presents the document image 540 on a screen of a display device in the same way the signature manager 522 prints the document image 540 on the paper of a printing device.

As previously described, the document manager 520 may process a document container 528 to generate a document image 540 in a standard file format used by the system 500, such as an Adobe PDF, for example. Additionally, or alternatively, the document manager 520 may also implement processes and workflows to prepare an electronic document 542 stored in the document container 528. For instance, assume a client 534 uses the client device 512 to prepare an electronic document 542 suitable for receiving an electronic signature, such as the lease agreement in the previous example. The client 534 may use the client device 512 to locally or remotely access document management tools, features, processes and workflows provided by the document manager 520 of the server device 502. The client 534 may prepare the electronic document 542 as a brand new originally written document, a modification of a previous electronic document, or from a document template with predefined information content. Once prepared, the signature manager 522 may implement electronic signature (e-sign) tools, features, processes and workflows provided by the signature manager 522 of the server device 502 to facilitate electronic signing of the electronic document 542.

In addition, as discussed above, the system 500 may include the identifier mapping engine 104, as shown in FIG. 1. As discussed herein, the identifier mapping engine 104 may implement a set of tools and/or algorithms to generate an identifier data model 114 for mapping identifiers that may be assigned to electronic documents by various computing systems to a unique document identifier (e.g., unique document identifier 304). The electronic document may include a legal electronic documents (e.g., agreements, legal pleadings, etc.), a non-legal electronic documents (e.g., articles, books, text, etc.), or any combinations thereof. The electronic documents may include text(s), audio(s), video(s), image(s), table(s), etc., and/or any combination thereof.

In some embodiments, the identifier data model may be configured to integrate structured and/or unstructured electronic documents (e.g., electronic agreements, data related to agreements, etc.) from various sources (e.g., computing systems). The identifier data model may allow different computing systems to interact with the electronic document irrespective of the specific unique identifier that may be assigned to the electronic document by the document-originating computing system. The identifier data model mapping may be configured to map all identifiers that are assigned by each computing system and/or process (whether internal and/or external to the document originating computing system) to the electronic document when such system/process interacts with the document. Each assigned identifier may be mapped to a common identifier to allow systems/processes that cannot adopt a particular unique identifier to continue using their identifiers. This may allow tracking, monitoring, and/or system/process-specific usage of electronic documents defined by the specific identifier assigned by that computing system/process to the document when it interacts with the electronic document. The identifier data model may be configured to preserve all source identifiers (i.e., identifiers assigned each computing system/process that interacted with the document) are preserved in their original form. The identifier data model may facilitate traceability and/or auditing across systems. Identifiers of new computing systems/processes that interact with the electronic document can be added without impacting existing mappings, e.g., the identifier data model may allow gradual adoption of new identifiers without immediate system overhauls (e.g., this may be especially useful for legacy systems). The identifier data model may support electronic documents involving multiple systems and may simplify identifier reconciliation across multiple computing systems. The identifier data model may centralize identifier mapping logic, thereby reducing complexity for different computing systems and/or processes when interacting with the electronic document.

The identifier mapping engine 104 may be configured to assign an identifier to a version of an electronic document, e.g., a first or original version of the electronic document (e.g., a lease agreement) that may be processed by a computing system. The identifier may be a unique electronic document identifier (e.g., UUID) and/or be any type of identifier, which may include any string of alpha-numeric characters, code, and/or any other information, data, etc., and/or be any combination thereof. Alternatively, or in addition, the identifier may be a complex structure, a partial reference, a hash-based identifier, a block reference, a content-based identifier, a cryptographic identifier, and/or any other type of identifier, and/or any combinations thereof. The assigned identifier may be used as a mapping node in an identifier data model to which other identifiers may be mapped to, so that interactions by various computing systems with the electronic document may be tracked and/or monitored. To generate the identifier data model, the identifier mapping engine 104 may be configured to receive another identifier from another computing system that that system may have assigned to the electronic document (and/or a version of such document) when that computing system processed and/or interacted with the electronic document (e.g., the lease agreement was executed in the second computing system which assigned an identifier to it). Upon receiving the identifier from the second computing system, the identifier mapping engine 104 may be configured to associate the received identifier with the unique identifier that was assigned to the electronic document by the first computing system. The identifier mapping engine 104 may then be configured to generate a data model that may map the second identifier to the first identifier, where each identifier may be represented as a node in the data model. In the identifier data model, each identifier may be associated with a version of the electronic document processed by a particular computing system. The identifier data model may be updated upon receipt of further identifiers that may have been assigned by computing systems after each interaction with the electronic document (e.g., a newly received identifier may be easily associated with the unique identifier that was initially assigned and/or with another identifier in the identifier data model). The identifier data model may be a tree-like model, a hierarchical model, and/or any other type of model.

In some embodiments, the identifier data model may be used to retrieve specific versions of electronic document associated with a particular identifier. For example, the signed lease agreement may be identified by a particular identifier and thus, using such identifier, the signed lease agreement may be retrieved and provided to the computing system that assigned the identifier, but not to other computing systems. Alternatively, or in addition, any computing system that presents a specific identifier may be provided with a version of the electronic document associated with that identifier. To retrieve a particular version of the document using a specific identifier assigned to it, the current subject matter system may be configured to receive a request or a query from a computing system to access the electronic document (and/or specific version of the document). The identifier data model may then be used to determine a specific identifier associated with a version of the electronic document processed and/or requested by that computing system. The version of the electronic document associated with the identifier may then be provided to the requesting computing system. In some embodiments, one or more interfaces (e.g., application programming interfaces) may be used for requesting and/or providing specific versions of electronic document to computing systems.

As discussed herein, any additional data (e.g., versions of electronic document (e.g., a signed lease agreement, etc.)) may be associated with the electronic document and/or any version thereof and may be assigned an identifier. The additional data may be generated by any computing system. The identifier may be the same identifier as has been originally assigned to the electronic document and/or may be a new identifier that may be associated with the unique identifier in the identifier data model.

Figure 6:
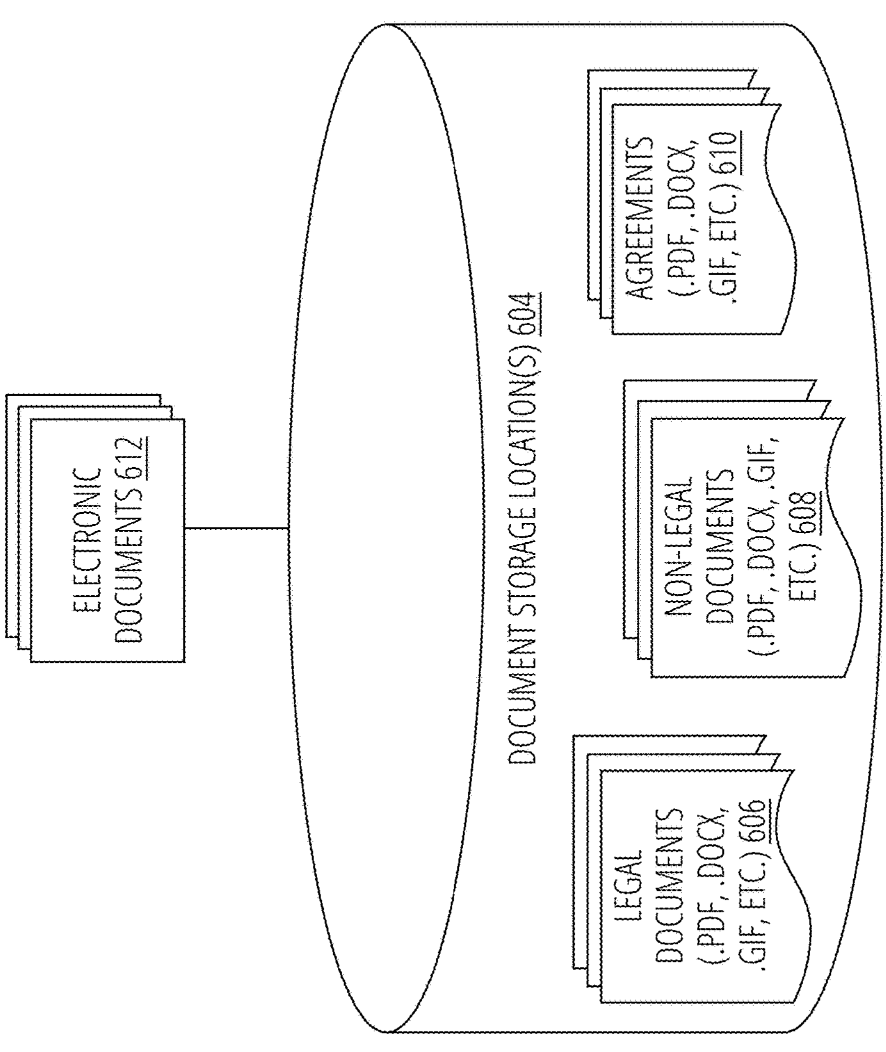
FIG. 6 illustrates an example of document storage location(s) that may be used as a source for the electronic documents, according to some embodiments of the current subject matter.

FIG. 6 illustrates an example of document storage location(s) 604 that may be used as a source for the electronic documents 612 that may be used for mapping of identifiers to documents and/or document versions, for example, according to some embodiments of the current subject matter. The document storage location(s) 604 may be a single database, repository, etc. and/or multiple databases, repositories, etc. The document storage location(s) 604 may be configured to store any type of documents, data, information, files, etc.

The documents may be any type of documents, such as, for example, agreements, applications, websites, video files, audio files, text files, images, graphics, tables, spreadsheets, computer programs, etc. For example, as shown in FIG. 6, the document storage location(s) 604 may store one or more legal documents 606, non-legal documents 608, and/or agreements 610. Any of the documents 606, 608, and/or 610 may be in any desired format, e.g., .pdf, .docx, .xls, and/or any other type of format. The documents may also have any desired size. Moreover, the documents may be organized in any desired fashion. In some examples, documents may be nested within other documents (e.g., one document embedded in another document); one document may be linked to another document, etc. As such, the document storage location(s) 604 may be a unified data storage location that may store any type, any size, any format, etc. documents, data, information, etc.

In some embodiments, the documents stored in the document storage location(s) 604 may be structured, unstructured, and/or semi-structured. Moreover, the documents may be labeled and/or unlabeled.

The documents stored in document storage location(s) 604 may be queried, searched, and/or retrieved by and/or provided to the identifier mapping engine 104 as electronic documents 612. For example, the identifier mapping engine 104 may retrieve all or particular sales agreements from the document storage location(s) 604 for the purposes of generating one or more identifier data models for use by computing systems (e.g., computing system A 402 and computing system B 404).

FIG. 7 illustrates an example of a document corpus 708 suitable for use by the identifier mapping engine 104 of the server device 502, such as, for example, for the purposes of execution of one or more tasks related to electronic documents (e.g., document generation, template creation, use of data and/or application of one computing system for the purposes of generation of electronic documents by another computing system, etc.). The document corpus 708 may be stored in one or more database and/or storage locations and may be accessible (e.g., via a query) by the identifier mapping engine 104. In general, a document corpus is a large and structured collection of electronic documents, such as text documents, that are typically used for natural language processing (NLP) tasks such as text classification, sentiment analysis, topic modeling, and information retrieval. A corpus can include a variety of document types such as web pages, books, news articles, social media posts, scientific papers, and more. The corpus may be created for a specific domain or purpose, and it may be annotated with metadata or labels to facilitate analysis. Document corpora are commonly used in research and industry to train machine learning models and to develop NLP applications.

As shown in FIG. 7, the document corpus 708 may include information from electronic documents 718 derived from the document records 538 stored in the data store 526. The electronic documents 718 may include any electronic document having metadata such as STME 532 suitable for receiving an electronic signature, including both signed electronic documents or unsigned electronic documents. Different sets of the electronic documents 718 of the document corpus 708 may be associated with different entities. For example, a first set of electronic documents 718 is associated with a company A 702. A second set of electronic documents 718 is associated with a company B 704. A third set of electronic documents 718 is associated with a company C 706. A fourth set of electronic documents 718 is associated with a company D 710. Although some embodiments discuss the document corpus 708 having electronic documents 718, it may be appreciated that the document corpus 708 may have unsigned electronic document as well, which may be mined using various AI/ML techniques. Embodiments are not limited in this context.

Each set of electronic documents 718 associated with a defined entity may include one or more subsets of the electronic documents 718 categorized by document type. For instance, the second set of electronic documents 718 associated with company B 704 may have a first subset of electronic documents 718 with a document type for supply agreements 712, a second subset of electronic documents 718 with a document type for lease agreements 716, and a third subset of electronic documents 718 with a document type for service agreements 714. In one embodiment, the sets and subsets of electronic documents 718 may be identified using labels manually assigned by a human operator, such as metadata added to a document record for a signed electronic document created in a document management system, or feedback from a user of the system during a document generation process. In one embodiment, the sets and subsets of electronic documents 718 may be unlabeled.

Figure 8:
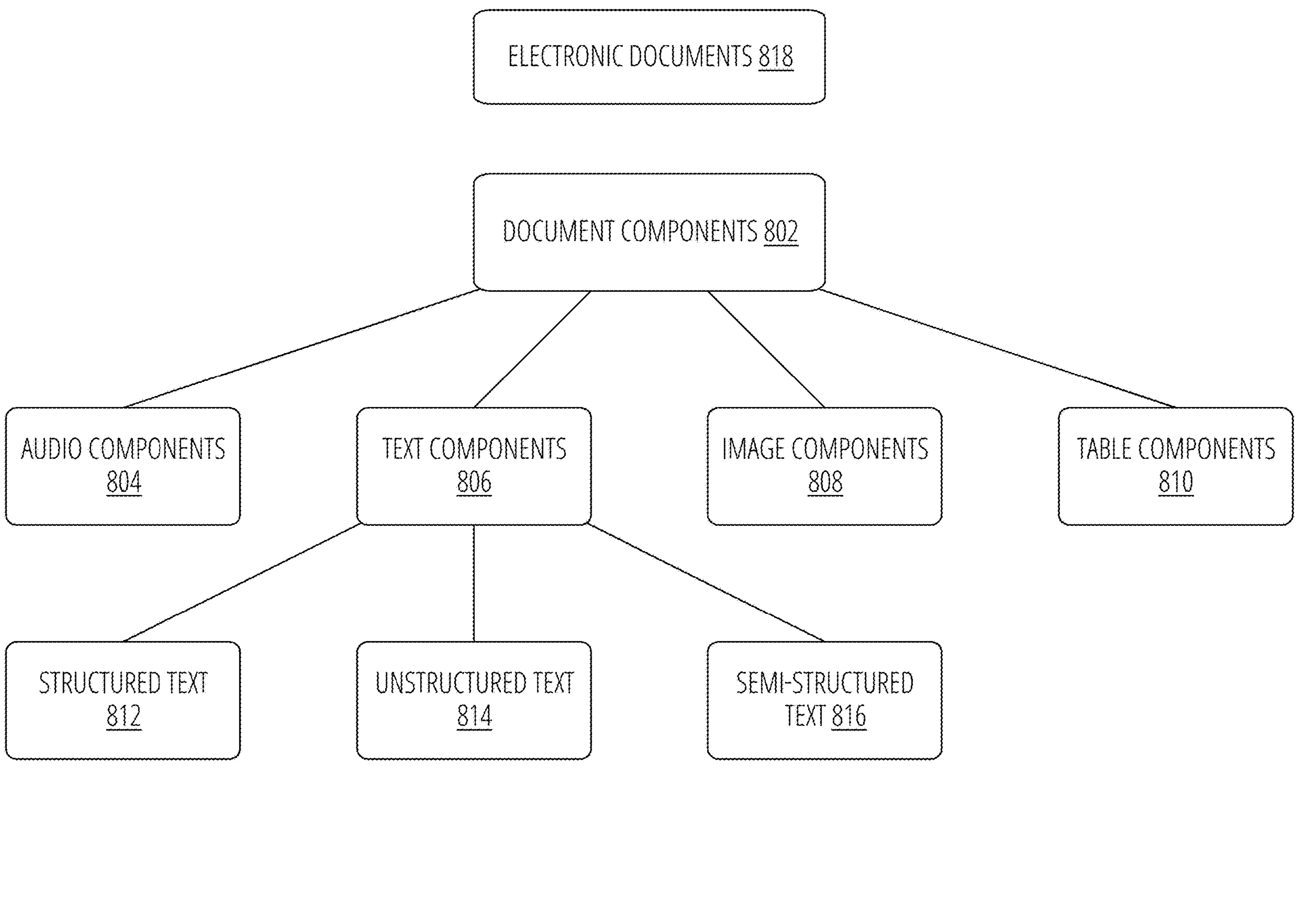
FIG. 8 illustrates electronic documents in accordance with one embodiment.

FIG. 8 illustrates an example of an electronic document 818. An electronic document 818 may include different information types that collectively form a set of document components 802 for the electronic document 818. The document components 802 may comprise, for example, one or more audio components 804, text components 806, image components 808, or table components 810. Each document component 802 may comprise different content types. For example, the text components 806 may comprise structured text 812, unstructured text 814, or semi-structured text 816.

Structured text 812 refers to text information that is organized in a specific format or schema, such as words, sentences, paragraphs, sections, clauses, and so forth. Structured text 812 has a well-defined set of rules that dictate how the data should be organized and represented, including the data types and relationships between data elements.

Unstructured text 814 refers to text information that does not have a predefined or organized format or schema. Unlike structured text 812, which is organized in a specific way, unstructured text 814 can take various forms, such as text information stored in a table, spreadsheet, figures, equations, header, footer, filename, metadata, and so forth.

Semi-structured text 816 is text information that does not fit neatly into the traditional categories of structured and unstructured data. It has some structure but does not conform to the rigid structure of a specific format or schema. Semi-structured data is characterized by the presence of context tags or metadata that provide some structure and context for the text information, such as a caption or description of a figure, name of a table, labels for equations, and so forth.

FIG. 9 illustrates an example process 900 for generating and/or using one or more identifier data models, according to some embodiments of the current subject matter. The process 900 may be executed by the system 100 shown in FIG. 1, and/or by systems 200 shown in FIG. 2 and/or system 400 shown in FIG. 4. In particular, the process 900 may be executed using identifier mapping engine 104.

At 902, the identifier mapping engine 104 may be configured to assign a first identifier (e.g., unique document identifier 204) in a plurality of identifiers to a first version (e.g., original document 202) in a plurality of versions of an electronic document (e.g., electronic document(s) 102) processed by a computing system (e.g., computing system A 206) in a plurality of computing systems.

At 904, the identifier mapping engine 104 may receive, from a second computing system (e.g., system(s) 210) in the plurality of computing systems a second identifier (e.g., respective identifiers 214) in the plurality of identifiers assigned to a second version (e.g., respective versions 212) of the electronic document by the second computing system. The second computing system may generate the second version of the electronic document by processing the electronic document and assigning the second identifier to the second version of the electronic document.

At 906, the identifier mapping engine 104 may generate a data model (e.g., identifier data model 114) mapping the second identifier to the first identifier (e.g., as shown in FIG. 3). Each identifier included in the data model may be associated with a version of the electronic document processed by a computing system in the plurality of computing systems. The data model may be stored (e.g., in document identifier mapping storage 112).

Figure 10:
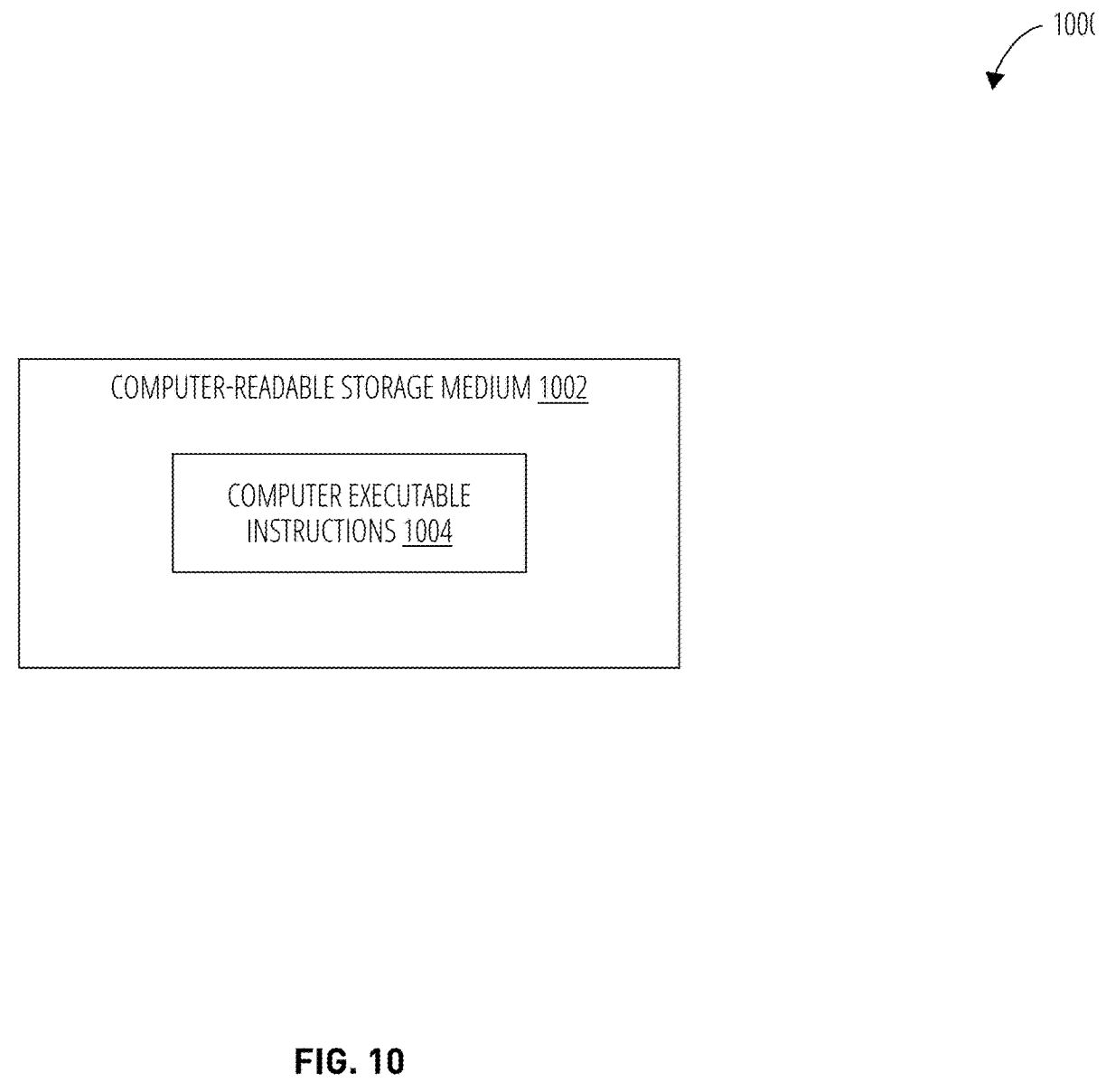

FIG. 10 illustrates an apparatus 1000. Apparatus 1000 comprises any non-transitory computer-readable storage medium 1002 or machine-readable storage medium, such as an optical, magnetic or semiconductor storage medium. In various embodiments, apparatus 1000 comprises an article of manufacture or a product. In some embodiments, the computer-readable storage medium 1002 stores computer executable instructions with which one or more processing devices or processing circuitry can execute. For example, computer executable instructions 1004 includes instructions to implement operations described with respect to any logic flows described herein. Examples of computer-readable storage medium 1002 or machine-readable storage medium include any tangible media capable of storing electronic data, including volatile memory or non-volatile memory, removable or non-removable memory, erasable or non-erasable memory, writeable or re-writeable memory, and so forth. Examples of computer executable instructions 1004 include any suitable type of code, such as source code, compiled code, interpreted code, executable code, static code, dynamic code, object-oriented code, visual code, and the like.

FIG. 11 illustrates an embodiment of a computing architecture 1100. Computing architecture 1100 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1100 has a single processor with one core or more than one processor. Note that the term "processor" refers to a processor with a single core or a processor package with multiple processor cores. In at least one embodiment, the computing architecture 1100 is representative of the components of the system 500. More generally, the computing architecture 1100 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1100. For example, a component is, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server are a component. One or more components reside within a process and/or thread of execution, and a component is localized on one computer and/or distributed between two or more computers. Further, components are communicatively coupled to each other by various types of communications media to coordinate operations. The coordination involves the uni-directional or bi-directional exchange of information. For instance, the components communicate information in the form of signals communicated over the communications media. The information is implemented as signals allocated to various signal lines. In such allocations, each message is a signal. Further embodiments, however, alternatively employ data messages. Such data messages may be sent across various connections. Exemplary connections include parallel interfaces, serial interfaces, and bus interfaces.

As shown in FIG. 11, computing architecture 1100 comprises a system-on-chip (SoC) 1102 for mounting platform components. System-on-chip (SoC) 1102 is a point-to-point (P2P) interconnect platform that includes a first processor 1104 and a second processor 1106 coupled via a point-to-point interconnect 1170 such as an Ultra Path Interconnect (UPI). In other embodiments, the computing architecture 1100 is another bus architecture, such as a multi-drop bus. Furthermore, each of processor 1104 and processor 1106 are processor packages with multiple processor cores including core(s) 1108 and core(s) 1110, respectively. While the computing architecture 1100 is an example of a two-socket (2S) platform, other embodiments include more than two sockets or one socket. For example, some embodiments include a four-socket (4S) platform or an eight-socket (8S) platform. Each socket is a mount for a processor and may have a socket identifier. Note that the term platform refers to a motherboard with certain components mounted such as the processor 1104 and chipset 1132. Some platforms include additional components, and some platforms include sockets to mount the processors and/or the chipset. Furthermore, some platforms do not have sockets (e.g., SoC, or the like). Although depicted as a SoC 1102, one or more of the components of the SoC 1102 are included in a single die package, a multi-chip module (MCM), a multi-die package, a chiplet, a bridge, and/or an interposer. Therefore, embodiments are not limited to a SoC.

The processor 1104 and processor 1106 are any commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures are also employed as the processor 1104 and/or processor 1106. Additionally, the processor 1104 need not be identical to processor 1106.

Processor 1104 includes an integrated memory controller (IMC) 1120 and point-to-point (P2P) interface 1124 and P2P interface 1128. Similarly, the processor 1106 includes an IMC 1122 as well as P2P interface 1126 and P2P interface 1130. IMC 1120 and IMC 1122 couple the processor 1104 and processor 1106, respectively, to respective memories (e.g., memory 1116 and memory 1118). Memory 1116 and memory 1118 are portions of the main memory (e.g., a dynamic random-access memory (DRAM)) for the platform such as double data rate type 4 (DDR4) or type 5 (DDR5) synchronous DRAM (SDRAM). In the present embodiment, the memory 1116 and the memory 1118 locally attach to the respective processors (i.e., processor 1104 and processor 1106). In other embodiments, the main memory couple with the processors via a bus and shared memory hub. Processor 1104 includes registers 1112 and processor 1106 includes registers 1114.

Computing architecture 1100 includes chipset 1132 coupled to processor 1104 and processor 1106. Furthermore, chipset 1132 are coupled to storage device 1150, for example, via an interface (I/F) 1138. The I/F 1138 may be, for example, a Peripheral Component Interconnect-enhanced (PCIe) interface, a Compute Express Link® (CXL) interface, or a Universal Chiplet Interconnect Express (UCIe) interface. Storage device 1150 stores instructions executable by circuitry of computing architecture 1100 (e.g., processor 1104, processor 1106, GPU 1148, accelerator 1154, vision processing unit 1156, or the like).

Processor 1104 couples to the chipset 1132 via P2P interface 1128 and P2P 1134 while processor 1106 couples to the chipset 1132 via P2P interface 1130 and P2P 1136. Direct media interface (DMI) 1176 and DMI 1178 couple the P2P interface 1128 and the P2P 1134 and the P2P interface 1130 and P2P 1136, respectively. DMI 1176 and DMI 1178 is a high-speed interconnect that facilitates, e.g., eight Giga Transfers per second (GT/s) such as DMI 3.0. In other embodiments, the processor 1104 and processor 1106 interconnect via a bus.

The chipset 1132 comprises a controller hub such as a platform controller hub (PCH). The chipset 1132 includes a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1132 comprises more than one controller hub such as a chipset with a memory controller hub, a graphics controller hub, and an input/output (I/O) controller hub.

In the depicted example, chipset 1132 couples with a trusted platform module (TPM) 1144 and UEFI, BIOS, FLASH circuitry 1146 via I/F 1142. The TPM 1144 is a dedicated microcontroller designed to secure hardware by integrating cryptographic keys into devices. The UEFI, BIOS, FLASH circuitry 1146 may provide pre-boot code. The I/F 1142 may also be coupled to a network interface circuit (NIC) 1180 for connections off-chip.

Furthermore, chipset 1132 includes the I/F 1138 to couple chipset 1132 with a high-performance graphics engine, such as, graphics processing circuitry or a graphics processing unit (GPU) 1148. In other embodiments, the computing architecture 1100 includes a flexible display interface (FDI) (not shown) between the processor 1104 and/or the processor 1106 and the chipset 1132. The FDI interconnects a graphics processor core in one or more of processor 1104 and/or processor 1106 with the chipset 1132.

The computing architecture 1100 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication is a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network is used to connect computers to each other, to the Internet, and to wired networks (which use IEEE 802.3-related media and functions).

Additionally, accelerator 1154 and/or vision processing unit 1156 are coupled to chipset 1132 via I/F 1138. The accelerator 1154 is representative of any type of accelerator device (e.g., a data streaming accelerator, cryptographic accelerator, cryptographic co-processor, an offload engine, etc.). One example of an accelerator 1154 is the Intel® Data Streaming Accelerator (DSA). The accelerator 1154 is a device including circuitry to accelerate copy operations, data encryption, hash value computation, data comparison operations (including comparison of data in memory 1116 and/or memory 1118), and/or data compression. Examples for the accelerator 1154 include a USB device, PCI device, PCIe device, CXL device, UCIe device, and/or an SPI device. The accelerator 1154 also includes circuitry arranged to execute machine learning (ML) related operations (e.g., training, inference, etc.) for ML models. Generally, the accelerator 1154 is specially designed to perform computationally intensive operations, such as hash value computations, comparison operations, cryptographic operations, and/or compression operations, in a manner that is more efficient than when performed by the processor 1104 or processor 1106. Because the load of the computing architecture 1100 includes hash value computations, comparison operations, cryptographic operations, and/or compression operations, the accelerator 1154 greatly increases performance of the computing architecture 1100 for these operations.

The accelerator 1154 includes one or more dedicated work queues and one or more shared work queues (each not pictured). Generally, a shared work queue is configured to store descriptors submitted by multiple software entities. The software is any type of executable code, such as a process, a thread, an application, a virtual machine, a container, a microservice, etc., that share the accelerator 1154. For example, the accelerator 1154 is shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1154 via a non-posted write (e.g., a deferred memory write (DMWr)). One example of an instruction that atomically submits a work descriptor to the shared work queue of the accelerator 1154 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 1154. The dedicated work queue may accept job submissions via commands such as the movdir64b instruction.

Various I/O devices 1160 and display 1152 couple to the bus 1172, along with a bus bridge 1158 which couples the bus 1172 to a second bus 1174 and an I/F 1140 that connects the bus 1172 with the chipset 1132. In one embodiment, the second bus 1174 is a low pin count (LPC) bus. Various input/output (I/O) devices couple to the second bus 1174 including, for example, a keyboard 1162, a mouse 1164 and communication devices 1166.

Furthermore, an audio I/O 1168 couples to second bus 1174. Many of the I/O devices 1160 and communication devices 1166 reside on the system-on-chip (SoC) 1102 while the keyboard 1162 and the mouse 1164 are add-on peripherals. In other embodiments, some or all the I/O devices 1160 and communication devices 1166 are add-on peripherals and do not reside on the system-on-chip (SoC) 1102.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 includes one or more clients 1202 and servers 1204. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 communicate information between each other using a communication framework 1206. The communication framework 1206 implements any well-known communications techniques and protocols. The communication framework 1206 is implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1206 implements various network interfaces arranged to accept, communicate, and connect to a communications network. A network interface is regarded as a specialized form of an input output interface. Network interfaces employ connection protocols including without limitation direct connect, Ethernet (e.g., thick, thin, twisted pair 10/100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces are used to engage with various communications network types. For example, multiple network interfaces are employed to allow for the communication over broadcast, multicast, and unicast networks. Should processing requirements dictate a greater amount speed and capacity, distributed network controller architectures are similarly employed to pool, load balance, and otherwise increase the communicative bandwidth required by clients 1202 and the servers 1204. A communications network is any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which may store an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application, or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items may be distinct, or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose, or it comprises a general-purpose computer as selectively activated or reconfigured by a computer program stored in the computer. The procedures presented herein are not inherently related to a particular computer or other apparatus. Various general-purpose machines are used with programs written in accordance with the teachings herein, or it proves convenient to construct more specialized apparatus to perform the required method steps. The required structure for a variety of these machines are apparent from the description given.

The following examples pertain to further embodiments, from which numerous permutations and configurations will be apparent.

In one aspect, a computer-implemented method assigning, using at least one processor, a first identifier in a plurality of identifiers to a first version in a plurality of versions of an electronic document processed by a computing system in a plurality of computing systems; receiving, using the at least one processor, from a second computing system in the plurality of computing systems a second identifier in the plurality of identifiers assigned to a second version the electronic document by the second computing system, wherein the second computing system is configured to generate the second version of the electronic document by processing the electronic document and assign the second identifier to the second version of the electronic document; and generating, using the at least one processor, a data model mapping the second identifier to the first identifier, wherein each identifier included in the data model is associated with a version of the electronic document processed by a computing system in the plurality of computing systems, and storing the data model.

The method may include receiving, using the at least one processor, a request from at least one computing system to access the electronic document; determining, using the at least one processor, using the data model, an identifier associated with a version of the electronic document processed by the at least one computing system; providing, using the at least one processor, using the determined identifier, the version of the electronic document to the at least one computing system.

The method may include wherein at least one interface is associated with the data model, wherein the at least one interface is used to provide the version of the electronic document to the at least one computing system.

The method may include wherein the at least one computing system is prevented from accessing another version of the electronic document not associated with the determined identifier.

The method may include wherein each identifier assigned to the electronic document is unique to a computing system in the plurality of computing that assigned the identifier to the electronic document.

The method may include receiving, using the at least one processor, additional data associated with the electronic document, the additional data being generated by the first computing system; associating, using the at least one processor, the additional data with the first version of the electronic document; and assigning, using the at least one processor, the first identifier to the additional data.

The method may include wherein the electronic document includes at least one of the following: a legal document type electronic document, a non-legal document type electronic document, or any combinations thereof.

The method may include wherein the electronic document includes at least one of the following: a text, an audio, a video, an image, a table, or any combination thereof.

In one aspect a system may include at least one processor; and at least one non-transitory storage media storing instructions, that when executed by the at least one processor, cause the at least one processor to: assign a first identifier in a plurality of identifiers to a first version in a plurality of versions of an electronic document processed by a computing system in a plurality of computing systems; receive, from a second computing system in the plurality of computing systems a second identifier in the plurality of identifiers assigned to a second version the electronic document by the second computing system, wherein the second computing system is configured to generate the second version of the electronic document by processing the electronic document and assign the second identifier to the second version of the electronic document; and generate a data model mapping the second identifier to the first identifier, wherein each identifier included in the data model is associated with a version of the electronic document processed by a computing system in the plurality of computing systems, and store the data model.

The system may include wherein the at least one processor is configured to receive a request from at least one computing system to access the electronic document; determine, using the data model, an identifier associated with a version of the electronic document processed by the at least one computing system; provide, using the determined identifier, the version of the electronic document to the at least one computing system.

The system may include wherein at least one interface is associated with the data model, wherein the at least one interface is used to provide the version of the electronic document to the at least one computing system.

The system may include wherein the at least one computing system is prevented from accessing another version of the electronic document not associated with the determined identifier.

The system may include wherein each identifier assigned to the electronic document is unique to a computing system in the plurality of computing that assigned the identifier to the electronic document.

The system may include wherein the at least one processor is configured to receive additional data associated with the electronic document, the additional data being generated by the first computing system; associate the additional data with the first version of the electronic document; and assign the first identifier to the additional data.

The system may include wherein the electronic document includes at least one of the following: a legal document type electronic document, a non-legal document type electronic document, or any combinations thereof.

The system may include wherein the electronic document includes at least one of the following: a text, an audio, a video, an image, a table, or any combination thereof.

In one aspect, a non-transitory computer-readable storage medium, the computer-readable storage medium including instructions that when executed by at least one processor, cause the at least one processor to: assign a first identifier in a plurality of identifiers to a first version in a plurality of versions of an electronic document processed by a computing system in a plurality of computing systems; receive, from a second computing system in the plurality of computing systems a second identifier in the plurality of identifiers assigned to a second version the electronic document by the second computing system, wherein the second computing system is configured to generate the second version of the electronic document by processing the electronic document and assign the second identifier to the second version of the electronic document; and generate a data model mapping the second identifier to the first identifier, wherein each identifier included in the data model is associated with a version of the electronic document processed by a computing system in the plurality of computing systems, and store the data model.

The non-transitory computer-readable storage medium may include wherein the at least one processor is configured to receive a request from at least one computing system to access the electronic document; determine, using the data model, an identifier associated with a version of the electronic document processed by the at least one computing system; provide, using the determined identifier, the version of the electronic document to the at least one computing system.

The non-transitory computer-readable storage medium may include wherein at least one interface is associated with the data model, wherein the at least one interface is used to provide the version of the electronic document to the at least one computing system.

The non-transitory computer-readable storage medium may include wherein the at least one computing system is prevented from accessing another version of the electronic document not associated with the determined identifier.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. A computer-implemented method, comprising:

assigning, using at least one processor, a first identifier in a plurality of identifiers to a first version in a plurality of versions of an electronic document processed by a first computing system in a plurality of computing systems;

receiving, using the at least one processor, from a second computing system in the plurality of computing systems, a second identifier in the plurality of identifiers assigned to a second version of the electronic document by the second computing system, wherein the second computing system is configured to generate the second version of the electronic document by processing the electronic document and assign the second identifier to the second version of the electronic document; and generating, using the at least one processor, a data model mapping the second identifier to the first identifier, wherein each identifier included in the data model is associated with a version of the electronic document processed by a computing system in the plurality of computing systems and a unique document identifier identifying the electronic document, and storing the data model.

2. The method of claim 1, further comprising receiving, using the at least one processor, a request from at least one computing system to access the electronic document;

determining, using the at least one processor, using the data model, an identifier associated with a version of the electronic document processed by the at least one computing system;

providing, using the at least one processor, using the determined identifier, the version of the electronic document to the at least one computing system.

3. The method of claim 2, wherein at least one interface is associated with the data model, wherein the at least one interface is used to provide the version of the electronic document to the at least one computing system.

4. The method of claim 2, wherein the at least one computing system is prevented from accessing another version of the electronic document not associated with the determined identifier.

5. The method of claim 1, wherein each identifier assigned to the electronic document is unique to a computing system in the plurality of computing that assigned the identifier to the electronic document.

6. The method of claim 1, further comprising receiving, using the at least one processor, additional data associated with the electronic document, the additional data being generated by the first computing system;

associating, using the at least one processor, the additional data with the first version of the electronic document; and assigning, using the at least one processor, the first identifier to the additional data.

7. The method of claim 1, wherein the electronic document includes at least one of the following: a legal document type electronic document, a non-legal document type electronic document, or any combinations thereof.

8. The method of claim 1, wherein the electronic document includes at least one of the following: a text, an audio, a video, an image, a table, or any combination thereof.

9. A system, comprising:

at least one processor; and at least one non-transitory storage media storing instructions, that when executed by the at least one processor, cause the at least one processor to:

assign a first identifier in a plurality of identifiers to a first version in a plurality of versions of an electronic document processed by a first computing system in a plurality of computing systems;

receive, from a second computing system in the plurality of computing systems, a second identifier in the plurality of identifiers assigned to a second version of the electronic document by the second computing system, wherein the second computing system is configured to generate the second version of the electronic document by processing the electronic document and assign the second identifier to the second version of the electronic document; and generate a data model mapping the second identifier to the first identifier, wherein each identifier included in the data model is associated with a version of the electronic document processed by a computing system in the plurality of computing systems and a unique document identifier identifying the electronic document, and store the data model.

10. The system of claim 9, wherein the at least one processor is configured to receive a request from at least one computing system to access the electronic document;

determine, using the data model, an identifier associated with a version of the electronic document processed by the at least one computing system;

provide, using the determined identifier, the version of the electronic document to the at least one computing system.

11. The system of claim 10, wherein at least one interface is associated with the data model, wherein the at least one interface is used to provide the version of the electronic document to the at least one computing system.

12. The system of claim 10, wherein the at least one computing system is prevented from accessing another version of the electronic document not associated with the determined identifier.

13. The system of claim 9, wherein each identifier assigned to the electronic document is unique to a computing system in the plurality of computing that assigned the identifier to the electronic document.

14. The system of claim 9, wherein the at least one processor is configured to receive additional data associated with the electronic document, the additional data being generated by the first computing system;

associate the additional data with the first version of the electronic document; and assign the first identifier to the additional data.

15. The system of claim 9, wherein the electronic document includes at least one of the following: a legal document type electronic document, a non-legal document type electronic document, or any combinations thereof.

16. The system of claim 9, wherein the electronic document includes at least one of the following: a text, an audio, a video, an image, a table, or any combination thereof.

17. A non-transitory computer-readable storage medium, the computer-readable storage medium including instructions that when executed by at least one processor, cause the at least one processor to:

assign a first identifier in a plurality of identifiers to a first version in a plurality of versions of an electronic document processed by a first computing system in a plurality of computing systems;

receive, from a second computing system in the plurality of computing systems, a second identifier in the plurality of identifiers assigned to a second version the electronic document by the second computing system, wherein the second computing system is configured to generate the second version of the electronic document by processing the electronic document and assign the second identifier to the second version of the electronic document; and generate a data model mapping the second identifier to the first identifier, wherein each identifier included in the data model is associated with a version of the electronic document processed by a computing system in the plurality of computing systems and a unique document identifier identifying the electronic document, and store the data model.

18. The non-transitory computer-readable storage medium of claim 17, wherein the at least one processor is configured to receive a request from at least one computing system to access the electronic document;

determine, using the data model, an identifier associated with a version of the electronic document processed by the at least one computing system;

provide, using the determined identifier, the version of the electronic document to the at least one computing system.

19. The non-transitory computer-readable storage medium of claim 18, wherein at least one interface is associated with the data model, wherein the at least one interface is used to provide the version of the electronic document to the at least one computing system.

20. The non-transitory computer-readable storage medium of claim 18, wherein the at least one computing system is prevented from accessing another version of the electronic document not associated with the determined identifier.

* * * * *